(12) United States Patent
Skjolsvold et al.

(10) Patent No.: US 10,635,500 B2
(45) Date of Patent: Apr. 28, 2020

(54) DECOUPLING PARTITIONING FOR SCALABILITY

(71) Applicant: MICROSOFT TECHNOLOGY LICENSING, LLC, Redmond, WA (US)

(72) Inventors: Arild E. Skjolsvold, Kenmore, WA (US); Bradley Gene Calder, Bellevue, WA (US); Ju Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/854,367

(22) Filed: Dec. 26, 2017

(65) Prior Publication Data

US 2018/0217872 A1 Aug. 2, 2018

Related U.S. Application Data

(63) Continuation of application No. 13/366,018, filed on Feb. 3, 2012, now Pat. No. 9,852,010.

(51) Int. Cl.
*G06F 9/50* (2006.01)
*G06F 3/06* (2006.01)
(Continued)

(52) U.S. Cl.
CPC .......... *G06F 9/5077* (2013.01); *G06F 3/0644* (2013.01); *G06F 9/45558* (2013.01); *G06F 9/5083* (2013.01); *G06F 16/278* (2019.01)

(58) Field of Classification Search
CPC .... G06F 16/278; G06F 3/0644; G06F 9/5077; G06F 9/5083; G06F 9/5066;
(Continued)

(56) References Cited

U.S. PATENT DOCUMENTS 6,801,949 B1 10/2004 Bruck et al.
6,813,637 B2 11/2004 Cable
(Continued)

FOREIGN PATENT DOCUMENTS

CN 1523498 A 8/2004
CN 1572120 A 1/2005
(Continued)

OTHER PUBLICATIONS

"Final Office Action Issued in U.S. Appl. No. 13/366,018", dated Jun. 27, 2014, 27 Pages.
(Continued)

*Primary Examiner* — Chirag R Patel
(74) *Attorney, Agent, or Firm* — Shook, Hardy & Bacon, LLP

(57) ABSTRACT

Systems and methods are provided that enable a general framework for partitioning application-defined computations (e.g., jobs) in a scalable environment. The general framework decouples partitioning of a computation from the other aspects of the computation. As a result, the effort required to define an application-defined job is reduced or minimized, as the user is not required to provide a partitioning algorithm. A user can optionally take advantage of a partitioning framework by providing application-defined interfaces to perform the desired job. Optionally, a user can provide additional information to allow for modification of how partitions are assigned.

20 Claims, 12 Drawing Sheets

(51) Int. Cl.
*G06F 16/27* (2019.01)
*G06F 9/455* (2018.01)

(58) Field of Classification Search
CPC ......... G06F 9/45558; G06F 2009/4557; G06F 9/5088; H04L 67/10; H04L 47/70
See application file for complete search history.

(56) References Cited

U.S. PATENT DOCUMENTS

| | | | |
|---|---|---|---|
| 6,985,464 | B2 | 1/2006 | Harper et al. |
| 7,290,260 | B2 | 10/2007 | Miller |
| 7,293,255 | B2 | 11/2007 | Kumar |
| 7,856,486 | B2 | 12/2010 | Robertson et al. |
| 7,886,039 | B2 | 2/2011 | Popescu et al. |
| 8,386,540 | B1 | 2/2013 | McAlister et al. |
| 8,392,482 | B1* | 3/2013 | McAlister ......... G06F 17/30584 707/899 |
| 8,868,711 | B2 | 10/2014 | Skjolsvold et al. |
| 2002/0178262 | A1 | 11/2002 | Bonnell et al. |
| 2003/0021252 | A1 | 1/2003 | Harper et al. |
| 2003/0126200 | A1 | 7/2003 | Wolff |
| 2004/0203378 | A1 | 10/2004 | Powers |
| 2004/0267920 | A1 | 12/2004 | Hydrie et al. |
| 2005/0193227 | A1 | 9/2005 | Nakahara et al. |
| 2006/0080273 | A1 | 4/2006 | Degenaro et al. |
| 2006/0136929 | A1* | 6/2006 | Miller ............ G06F 9/5083 718/105 |
| 2006/0168107 | A1* | 7/2006 | Balan ............ G06F 9/505 709/218 |
| 2006/0230407 | A1* | 10/2006 | Rosu ............ G06F 9/5088 718/105 |
| 2006/0245433 | A1 | 11/2006 | Berg et al. |
| 2007/0033447 | A1 | 2/2007 | Fujibayashi |
| 2007/0067435 | A1 | 3/2007 | Landis et al. |
| 2007/0143442 | A1 | 6/2007 | Zhang et al. |
| 2007/0156842 | A1 | 7/2007 | Vermeulen et al. |
| 2007/0171921 | A1 | 7/2007 | Wookey et al. |
| 2007/0174288 | A1* | 7/2007 | Stoyanova ............ H04L 67/02 |
| 2007/0233803 | A1 | 10/2007 | Stienhans |
| 2009/0006885 | A1 | 1/2009 | Pattabhiraman et al. |
| 2009/0089406 | A1* | 4/2009 | Roush ............ G06F 9/5077 709/220 |
| 2009/0172155 | A1 | 7/2009 | Artobello et al. |
| 2009/0210431 | A1* | 8/2009 | Marinkovic ......... G06F 17/302 |
| 2009/0307339 | A1 | 12/2009 | Setnes et al. |
| 2010/0094981 | A1 | 4/2010 | Cordray et al. |
| 2010/0185704 | A1 | 7/2010 | George et al. |
| 2010/0232372 | A1 | 9/2010 | Jakllari et al. |
| 2010/0262860 | A1 | 10/2010 | Sargor et al. |
| 2010/0325339 | A1* | 12/2010 | Ogawa ............ G06F 3/061 711/103 |
| 2011/0010339 | A1 | 1/2011 | Wipfel et al. |
| 2011/0016214 | A1 | 1/2011 | Jackson |
| 2011/0179105 | A1 | 7/2011 | Lindsay et al. |
| 2011/0276695 | A1 | 11/2011 | Maldaner |
| 2012/0042030 | A1 | 2/2012 | Deshmukh et al. |
| 2012/0294152 | A1 | 11/2012 | Yousefi'zadeh et al. |
| 2012/0297307 | A1 | 11/2012 | Rider et al. |
| 2013/0204917 | A1 | 8/2013 | Wang et al. |
| 2013/0204991 | A1 | 8/2013 | Skjolsvold et al. |

FOREIGN PATENT DOCUMENTS

| | | |
|---|---|---|
| CN | 101009648 A | 8/2007 |
| JP | 2003508996 A | 3/2003 |
| JP | 2004508616 A | 3/2004 |
| JP | 2004521181 A | 7/2004 |
| JP | 2005516293 A | 6/2005 |
| JP | 2005182702 A | 7/2005 |
| KR | 20110082529 A | 7/2011 |
| WO | 2011041101 A1 | 4/2011 |
| WO | 2011159842 A2 | 12/2011 |

OTHER PUBLICATIONS

"Final Office Action Issued in U.S. Appl. No. 13/366,018", dated May 6, 2016, 28 Pages.
"Non Final Office Action Issued in U.S. Appl. No. 13/366,018", dated Sep. 8, 2015, 27 Pages.
"Non Final Office Action Issued in U.S. Appl. No. 13/366,018", dated Dec. 19, 2016, 30 Pages.
"Non- Final Office Action Issued in U.S. Appl. No. 13/366,018", dated Sep. 24, 2013, 27 Pages.
"Notice of Allowance Issued in U.S. Appl. No. 13/366,018", dated Aug. 14, 2017, 13 Pages.
"Final Office Action Issued in U.S. Appl. No. 13/366,039", dated May 5, 2016, 32 Pages.
"Final Office Action Issued in U.S. Appl. No. 13/366,039", dated Aug. 28, 2014, 31 Pages.
"Final Office Action Issued in U.S. Appl. No. 13/366,039", dated Sep. 1, 2017, 34 Pages.
"Non Final Office Action Issued in U.S. Appl. No. 13/366,039", dated Dec. 3, 2013, 27 Pages.
"Non Final Office action Issued in U.S. Appl. No. 13/366,039", dated Sep. 8, 2015, 31 Pages.
"Non Final Office Action Issued in U.S. Appl. No. 13/366,039", dated Jan. 6, 2017, 32 Pages.
"Final Office Action Issued in U.S. Appl. No. 13/366,052", dated Nov. 15, 2013, 19 Pages.
"Non Final Office Action Issued in U.S. Appl. No. 13/366,052", dated May 7, 2013, 16 Pages.
"Extended European Report Issued in European Patent Application No. 13742889.2", dated Jul. 7, 2016, 7 Pages.
"Extended European Issued in European Patent Application No. 13743069.0", dated Jul. 11, 2016, 12 Pages.
"Office Action Issued in European Patent Application No. 13743069. 0", dated Mar. 28, 2018, 5 Pages.
"First Office Action and Search Report Received for Chinese Patent Application No. 201380007789.7", dated Dec. 2, 2016, 17 Pages.
"Office Action Issued in Chinese patent Application No. 201380007789. 7", dated Aug. 2, 2017, 6 Pages.
"Office Action Issued in Chinese patent Application No. 201380007789. 7", dated Jan. 8, 2018, 6 Pages.
"First Office Action and Search Report Received for Chinese Patent Application No. 201380007805.2", dated Dec. 27, 2016, 11 Pages.
"Second Office Action Issued in Chinese Patent Application No. 201380007805.2", dated Sep. 6, 2017, 7 Pages.
"Office Action Issued in Japanese Patent Application No. 2014-555730", dated Mar. 29, 2017, 8 Pages.
"Office Action Issued in Japan Patent Application No:2014-555763", dated Mar. 23, 2017, 6 pages.
U.S. Appl. No. 61/355,079, "Virtual Computing Infrastructure", Mailed Date: Jun. 15, 2010, 74 Pages.
Cardellini, Valeria, et al., "Dynamic Load Balancing on Web-Server Systems", Published in IEEE Internet Computing, vol. 3, No. 3, pp. 28-39, May-Jun. 1999, 24 Pages.
Kremien, Orly, et al., "Scalable, Adaptive Load Sharing for Distributed Systems", Published in IEEE Parallel & Distributed Technology, Aug. 1993, 9 Pages.
Lampson, Butler W, "How to Build a Highly Available System Using Consensus", In Proceedings of the 10th International Workshop on Distributed Algorithms, Oct. 9, 1996, 17 Pages.
"International Search Report and Written Opinion Issued in PCT Applicationa No. PCT/US2013/024242", dated May 29, 2013, 11 Pages.
"International Search Report and Written Opinion issued in PCT Application No. PCT/US2013/024366", dated Apr. 29, 2013, 10 Pages.
"Office Action Issued in European Patent Application No. 13743069. 0", dated Jul. 27, 2018, 4 Pages.
Calder, et al., "Windows Azure Storage: A Highly Available Cloud Storage Service with Strong Consistency", In Proceedings of 23rd ACM Symposium on Operating Systems Principles, Oct. 26, 2011, 15 Pages.
White, "Hadoop: The Definitive Guide", In Publication of O'Reilly Media, Oct. 2010, 625 Pages.

(56) References Cited

OTHER PUBLICATIONS

"Notice of Allowance Issued in Korean Patent application No. 10-2014-7021737", dated May 17, 2019, 3 Pages.
"Notice of Allowance Issued in Korean Patent application No. 10-2014-7021738", dated May 17, 2019, 3 Pages.
"Office Action Issued in Korean Patent Application No. 10-2014-7021737", dated Dec. 19, 2018, 6 Pages.
"Office Action Issued in Korean Patent Application No. 10-2014-7021738", dated Dec. 19, 2018, 18 Pages.

* cited by examiner

DECOUPLING PARTITIONING FOR SCALABILITY

CROSS REFERENCE TO RELATED APPLICATIONS

This application claims priority to and is a continuance of U.S. patent application Ser. No. 13/366,018, filed on Feb. 3, 2012 entitled "DECOUPLING PARTITIONING FOR SCALABILITY", by Arild E. Skjolsvold, et al., the disclosure of which is hereby incorporated herein by reference in its entirety.

BACKGROUND

Cloud computing environments provide a potential platform for allowing users to have access to large amounts of computing resources without having to invest in corresponding infrastructure. Instead, the computing environment can be provided as a service by a cloud computing provider. This can allow a user to tune the requested computing resources to match the size and importance of a computing job. However, taking full advantage of the additional computing resources available as a service may require dividing computing tasks into smaller portions, so that multiple physical or virtual processors can be used to perform a task.

SUMMARY

In various embodiments, systems and methods are provided that enable a general framework for partitioning application-defined computations (e.g. jobs) in a scalable environment. The general framework decouples partitioning of a computation from the other aspects of the computation. As a result, the effort required to define an application-defiend job is reduced or minimized, as the user is not required to provide a partitioning algorithm. Instead, a user may take advantage of the partitioning framework by providing application-defined interfaces to supplement the features to perform the desired job. Optionally, a user can provide additional information to allow for modification of how partitions are assigned.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The invention is described in detail below with reference to the attached drawing figures, wherein.

DETAILED DESCRIPTION

Overview

Figure 1:
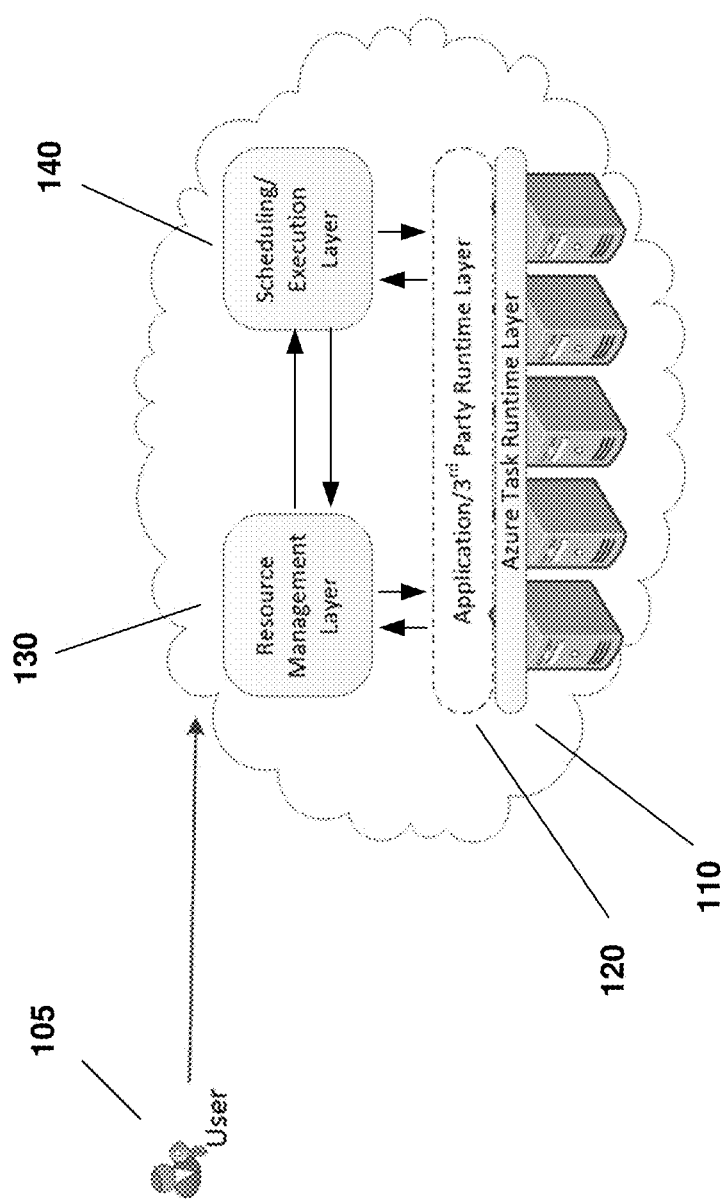
FIGS. 1 to 3 schematically show various aspects of an example of a distributed computing environment, in accordance with aspects of the present invention.

Due to increases in the speed of data transmission over networks and improvements in other network features, it is increasingly possible to perform large scale computing tasks in an environment where computing resources are distributed over a large network. A user in a first location can submit a job or computing task to a computing service and have the task performed on a group of computers that the user has no direct knowledge of. The computing resources for performing the user's task may be distributed over multiple locations. A first group of computing resources located in one or more locations can store the data and other information for performing the user's computing task, while a second group of computing resources, in the same locations or possibly in a different set of one or more locations, can be used to perform the computing task.

Access to a variety of distributed computing resources allows a user to perform job tasks without concern for where the computing resources are located. The distributed resources also provide an opportunity for a user to scale up (or scale down) the amount of resources used in order to meet goals for a computing task, such as completing the computing task by a specified time. However, using distributed computing resources poses a number of challenges for a user. Conventionally, a user or application designer would need to divert resources away from designing an application or job in order to determine how to take advantage of a specific distributed computing environment.

In various embodiments, systems and methods are provided that enable a generic framework for building scalable applications in a distributed environment, such as a cloud computing environment. The generic framework can allow the partitioning of jobs or work items to be decoupled from performing computations associated with the jobs or work items. This allows the owner of a distributed environment to provide resources to a user in an accessible or simplified manner while still providing a high availability for the distributed resources. The generic framework reduces the complexity of designing applications for a distributed environment by providing a framework for handling features such as scalability, fault tolerance, and/or availability while reducing or minimizing the amount of effort required to address these features. As a result, the framework can allow an application designer to focus on the application instead of spending additional time on requirements of the distributed environment.

Definitions

A "key" is one of the basic concepts used in a generic partitioning framework. A key is a value from a namespace or domain. An example of a namespace is an identifier corresponding to all storage accounts in a cloud computing environment. In such an example, a key can correspond to an account name, account number, or another identifier that allows a specific account to be referenced. Another example of a namespace is the range of possible alphanumeric values for an input parameter for a job. Preferably, the keys that span a namespace will also have some method of organization so that keys can be described as a range of serial values. For example, the keys can be organized numerically, alphabetically, based on hashed values, or in any other convenient serial manner that allows a range of keys to be defined based on specifying two keys as a range beginning and a range end.

A "partition" is a range defined by a low (inclusive) and high (exclusive) key. A partition can never be an empty range. If desired, a single partition may contain the entire range of the domain. Partitions are defined to be mutually exclusive, so that there is not an overlap between the ranges of two different partitions. The union of all partitions will span the entire domain or namespace.

A "partition server" is a virtual machine within a cloud computing environment that corresponds to a role instance for serving zero or more partitions. A partition is not served by more than one partition server at the same time. However, a given partition server may not have any partitions that are currently being served by the partition server. A partition server can include both application-defined interfaces and fixed interfaces (defined by the partitioning system) for performing various actions.

A "partition master" is a role that manages partition servers for a given type of role, such as by assigning and unassigning partitions to partition servers. The partition master role also monitors partition servers, such as by verifying that the partition servers are still serving assigned partitions. Typically, this role is redundant for fault tolerance. A partition master can include both application-defined interfaces and fixed interfaces (defined by the partitioning system) for performing various actions.

An "application-defined interface" refers to a computation, operation, or other function defined by a client for performance by a role instance. An application-defined interface can be created for either a partition master or partition server role. An application-defined interface is in contrast to a "fixed interface" for a partitioning system. A fixed interface refers to an application interface that is provided as part of the partitioning system. A client cannot modify the action of a fixed interface. However, an application-defined interface can be used in conjunction with a fixed interface. For example, a fixed interface for a master role can be to send a heartbeat message every time period to verify the status of any servers being managed by the master role. A corresponding fixed interface for a server role can be an interface to respond to the heartbeat message in an appropriate manner. An example of an application-defined interface can be an interface that adds additional information to a heartbeat message, while another example can be an interface to extract such additional information from a heartbeat message. In this situation, the sending of the heartbeat message itself is a fixed interface. A user or application cannot modify the protocol for sending the message. However, the interface for defining the message content can be modified by a user. The basic structure of the interface for supplementing the information in a heartbeat message may be provided by the system. However, since a client can modify the content provided by this interface, such an interface is defined herein as an application-defined interface.

As another example, application-defined interfaces can be used in conjunction with fixed interfaces to provide the overall feature of load balancing. The interfaces for assigning partitions to a partition server or splitting a partition into two partitions are fixed interfaces. However, application-defined interfaces can provide expressions for when load balancing actions should occur, like changing partition assignments between machines or deciding when to split a partition.

Each active partition master role or partition server role has a corresponding storage object that controls the data corresponding to the role. An example of a storage object is a binary large object or blob. For a partition server, the storage object includes the identity of the partitions being served. Note that the storage object for a partition server will typically not contain the underlying data corresponding to the partition. By only storing partition identities while leaving the underlying data in a separate data storage location, partitions can be moved from one server to another with a minimum of data transfer. For a partition master, the storage object includes information for establishing that a particular instance of the partition master is the active instance. The storage object can optionally also include information regarding all storage objects for servers being managed by the master. During operation, master and server roles can maintain a lease on the corresponding storage object. When a lease on a storage object for a role is broken, the corresponding role can be terminated.

As noted above, partition masters for a given type of role are preferably redundant, so that at least one additional partition master is available if a failure occurs. A "dictator" is defined as the partition master that current performs the partition master functions for a given type of role. The dictator is the partition master that maintains the lease for the storage object associated with the given partition master role.

The active partition master (dictator) can communicate with the partition servers via heartbeats. The basic heartbeat is of type 'keepalive' and is always used. As noted above, an application-defined interface can be used to add optional commands and/or information to this heartbeat message.

Namespaces, Keys, and Partitions

In various embodiments, a generic partitioning framework is provided so that a user or application can define a computation that is automatically partitioned for processing in a distributed computing environment. To take advantage of the generic partitioning framework, a user can define a computation based on a namespace. A namespace corresponds to one or more computations or calculations that are optionally performed on data associated with the namespace. The user-defined namespace can have certain properties as described below. As long as the namespace has the necessary properties, the generic partitioning framework will be able to automatically partition the namespace based on the application-defined interfaces. This partitioning is accomplished using only the user-defined namespace and fixed interfaces provided with the partitioning system. By partitioning a namespace using only fixed interfaces of the generic partitioning system, the partitioning is decoupled from any application-defined interfaces provided by the user as well as being decoupled from the nature of the computation(s) being performed.

A namespace or domain for a job can correspond to a set of identifiers for the full range of a type of data that will be operated on and/or generated by a computation. Additionally or alternately, a namespace or domain can correspond to a listing or range of possible states that could be operated on and/or generated by the computation. Still another option is that the namespace can correspond to a set of identifiers for multiple instances of a calculation being performed in a distributed environment. It is not necessary for all potential namespaces or domains for a computation to be identified. Instead, the user can identify the namespaces or states that will be used for partitioning. The identified namespaces or domains should span the entirety of the computations that a user will desire to perform using a given role. The entirety of the computations can be spanned by spanning the entirety of a data set operated on by a computation, by spanning the entirety of instances of calculations within the computation, or in any other convenient manner Keys can be used to specify discrete values or states within a namespace. Keys can also be used to specify a range of values. Since keys can be used to specify a range, it is understood that the namespace should include some type of serial ordering, so that specifying an upper key and a lower key will uniquely identify a range. This ordering can be based on a conventional ordering, such as ordering based on an alphabet. Alternatively, the ordering can be arbitrary, such as a serial order based on a file containing a listing of the values within a namespace.

In addition to defining a namespace (including any computations performed using that namespace), a user can also provide one or more application-defined interfaces associated with a server role. An application-defined interface represents one or more tasks or functions that a partition server can perform, the tasks or functions optionally involving one or more namespaces. The application-defined interfaces for a server role can include all tasks or functions that will be performed on a given namespace, so that different server roles do not attempt to access the same data or states. Optionally, it is contemplated that in an exemplary aspect a server role may also include sub-roles, so that some application-defined interfaces within a role operate on different namespaces than other application-defined interfaces within the same role. In a simple example, a client may desire to perform a computation that involves performing at least one type of calculation on a data set. In this situation, a client may define a single role of a server that performs at least one type of calculation on requested element(s) from the data set. This single role can represent one or more servers corresponding to role instances that are configured to perform a scientific calculation, one or more related data mining functions on a data set, or any other convenient computation. The computation and any related data can be defined as part of the definition of a namespace for performing the computation. Additionally, one or more application-defined interfaces can be provided for the server role, such as an application-defined interface for providing metrics regarding the computation to a master role instance. A server role instance can determine the element or elements of the data set to work on based on key values passed to the server. At least one additional master role can manage the servers, including assigning data set partitions to the one or more servers.

Based on a namespace, a computation can be partitioned so that multiple partition servers handle or perform different portions of processing for the namespace. Each partition corresponds to a range of key values. When a partition is assigned to a partition server, the server performs the desired computation for any requests that contain a key value within the range corresponding to an assigned partition. The partitions assigned to a server do not need to be consecutive relative to the serial ordering of the namespace.

In a generic partitioning environment, a partition table can be used to track the current assignments of partitions to partition servers. When an active master or dictator assigns a partition to a server, the partition table can be updated first to reflect the assignment. The partition table can then be used to determine the partition server that will handle a client request based on the key specified in the client request. Optionally, one partition table can be used to track the partition assignments for multiple roles, as opposed to having a different partition table for each namespace that is partitioned. As an example, an entry in a partition table can include the low key for a range, the high key for the range, and the role instance or server instance that will perform a requested task on the data or state corresponding to requested key. A partition table can also include other data, such as an epoch number or version number, as will be discussed in greater detail below.

Managing Master and Server Role Instances

When performing a job, it will often be desirable to have several master role instances to provide redundancy. However, to avoid conflicts, only one master role instance can be the active master at a given time. When a plurality of master role instances are present, the master role instances compete for a lease on the storage object corresponding to the full namespace. The master role instance that is granted the lease becomes the active master or dictator. In addition a master epoch number is stored in the storage object for the master role instance. When a master becomes dictator it increments this number, writes it back to the master role storage object, and subsequently uses the epoch number to communicate with the corresponding partition servers. The active master instance or dictator can also obtain a lease on the partition table or at least a portion of the partition table. Partition servers will ignore heartbeats with a master epoch lower than the highest epoch already seen, thus avoiding stale heartbeats from a master role that is no longer the dictator.

One option is to use a separate dictatorship library to implement dictatorship via storage object lease. Having a separate dictatorship library can offer several advantages, such as allowing a role outside of the partitioning system to implement redundancy. This allows roles that are not involved in partitioning to use the same method for selecting an active master role.

Each server maintains a lease on its own storage object. Server storage object names are generated by the master each time a server receives its first partition assignment. Each server also stores its current partition assignment (list of partitions including epoch numbers) in the storage object. A third party can forcefully terminate the lease between a server and its storage object. This functionality can be used by the partition master dictator to break server leases in the partition assignment protocols.

While having redundant instances of a master role allows for improved performance when a failure event occurs, the redundant instances can also potentially cause a problem due to stale updates. A stale update refers to a situation where a message or instruction from a prior dictator is received by a server or data store after a new dictator has been selected. The problem of stale updates may affect any role or piece of code which maintains state in an external store where messages to the external store may be delayed or re-ordered (e.g. over the internet), and where the state is read from that store upon failover of the role.

As an example consider a partition master (dictator) that fails over in the middle of updating the partition table for the role. First, the old master initiates an update of row 'X' of the partition table. The old master then stops working. A redundant instance of the master is selected as the new dictator. This new active master updates, reads, or otherwise performs an action using row 'X' of the partition table. The update from the old master then goes through after the action on row 'X' by the new active master. If the update from the old master is incorporated into the partition table, the update will cause the partition table to change without the new (current) master being aware of the change. This can lead to an inconsistent state for the partition table.

One solution to the problem in the example above is to somehow block the stale update from the old master. One option is to also allow partition masters to obtain leases on portions of the partition table. A lease for a master can correspond to all of the partitions in the table corresponding to a given namespace. Any convenient method for specifying a lease range can be used. For example, if it is desired, a lease can span only a portion of a partition and/or can span multiple partitions. When a new dictator is selected, the masters will still compete for dictatorship via a lease, where an epoch number is provided so the servers can block stale updates, such as stale heartbeat messages. In addition, the master dictator can also acquire a lease on the (relevant part of the) partition table before reading the table when building its state.

More generally, both masters and servers can use the lease mechanism to avoid stale updates by acquiring leases to blobs, tables, and/or other data structures when the master or server is assigned to handle a data structure. When the master or server is no longer assigned to the data structure, such as due to a failover or an explicit request by a master to change an assignment, the lease is released.

Stale updates can also be a concern for communication between a master and a server. Processing of messages from an old master can be avoided, for example, by having a master obtain an epoch number when it becomes the dictator. The epoch number is increased for every dictatorship failover. This epoch number can be transmitted on every server heartbeat and/or other message from a master to a server. A server can ignore any heartbeat with a lower epoch number than the highest epoch number the server has seen. This high-watermark epoch number can be stored in the servers' soft state. If a master and a server are also communicating status via storage object leases, the above method can be sufficient to avoid stale message issues. Alternatively, other convenient solutions for avoiding stale messages between a master and a server can also be used.

A similar epoch number method can be used for each range partition to avoid stale updates from a previously assigned server. For example, each partition can have a current epoch number that is updated by the master when a change occurs for the partition. Examples of changes for a partition include assignment of a partition to a new server, splitting of a partition, and merging of two partitions. Assignments of a partition to a new server can cause the epoch number to increase by one. Splitting of a partition into two or more new partitions can cause each child partition to receive the parent's epoch number incremented by one. When two partitions are merged, the epoch number for the merged partition can be the maximum epoch number for any of the partitions prior to merge incremented by one. Alternatively, any other convenient method for tracking an incrementing an epoch number for a partition can also be used.

As an example of how the partition epoch number may be used, consider a system with a partition master, two partition servers S1 and S2, and a third server X. The third server X can be, for example, a data server that contains the actual data set for the namespace operated on by the partition master and servers S1 and S2. Servers S1 and S2 issue commands (or other messages) to X. Assume messages can be delayed on the way from S1 or S2 to X, such as due to processing by a front-end for X. Unless X keeps track of the highest epoch seen for a given range partition it is easy to see how a stale message may be accepted by X. For example, a partition P with epoch 3 can initially be served by server S1. S1 can send a message M1 to X. Message M1 contains a key corresponding to partition P as well as the epoch number 3. The partition master then moves partition P from S1 to S2. After assignment, S2 sends a message M2 to server X that includes the new epoch number. X receives the message M2 prior to receiving message M1. This renders M1 stale. X then receives stale message M1. By tracking the epoch number, server X can recognize that the stale message M1 is from a server that no longer is responsible for partition P.

To further avoid the potential for stale updates, an epoch validation library can be used. An epoch validation library validates that a received message is not stale. For example, when a server receives a message from a new dictator or receives a request related to a new partition range, the server can check an epoch validation library to verify that the message contains the current epoch number for the master or the partition.

Figure 4:
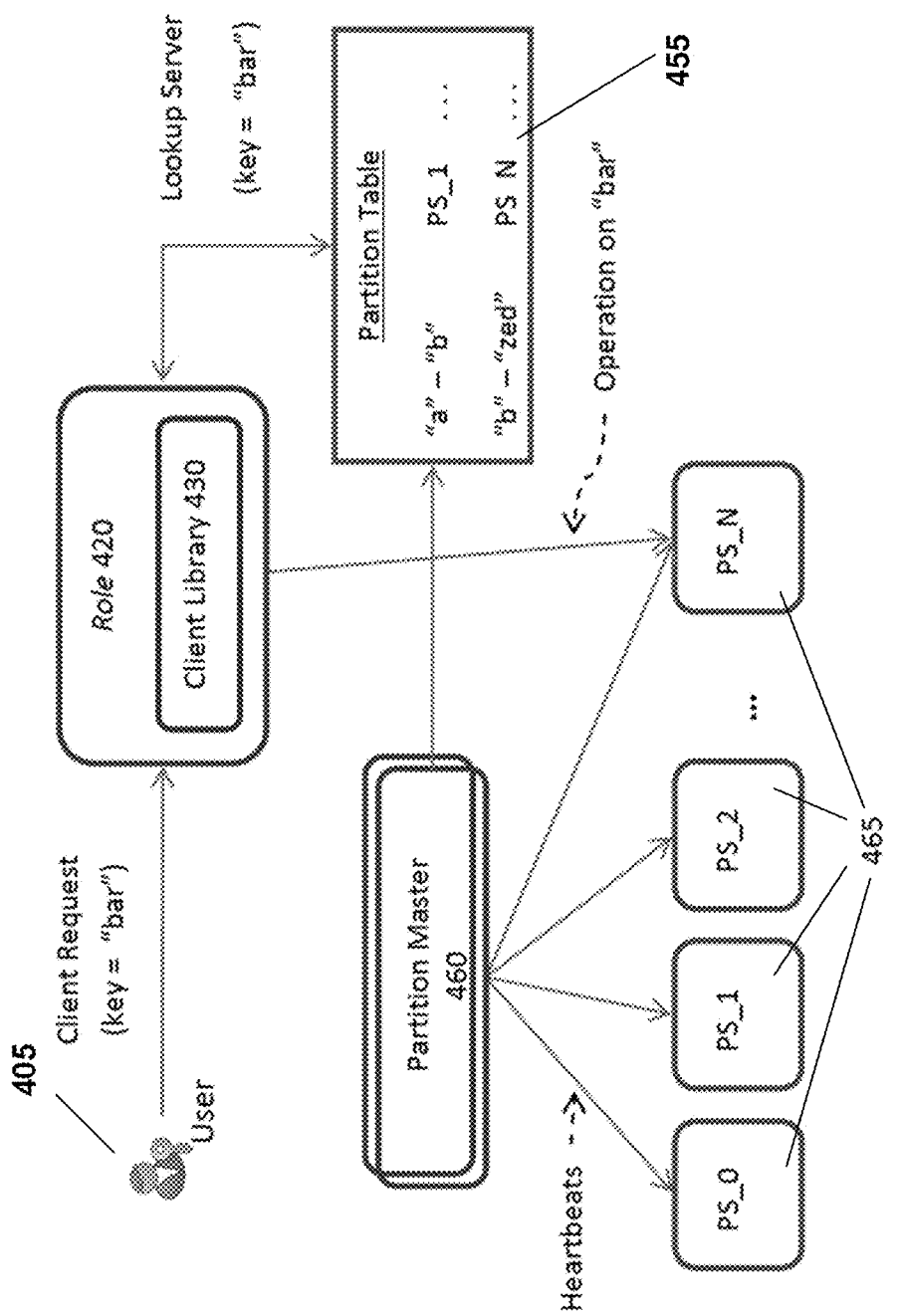
FIG. 4 schematically shows the interaction between various interfaces for performing a job in a generic partitioning environment, in accordance with aspects of the present invention.

FIG. 4 shows a schematic example of the relationship between roles, partitions, and keys. In FIG. 4, a user 405 submits a request to perform an action on a desired piece of data, such as accessing information in the user's account. The data is identified by a key. The client request and the key are passed to role 420 which handles the type of request made by the client or user 405. Role 420 includes a client library 430 that defines how the role handles a given type of request. Based on the type of request and the key, the role 420 consults the partition table 455 to find the current server that handles the key range corresponding to the key in the request. The information in partition table 455 is populated based on the partition decisions made by partition master 460. Partition master 460 is shown in FIG. 4 as being one of a plurality of potential partition masters. The additional potential partition masters are for redundancy, and are not active until needed. In the example in FIG. 4, a plurality of partition servers 465 are available as role instances for performing tasks requested from the role 420. Based on partition table 455, partition server N from plurality of partition servers 465 is handling the range of keys corresponding to the key in the client request.

Example of Generic Partitioning Framework

Figure 5:
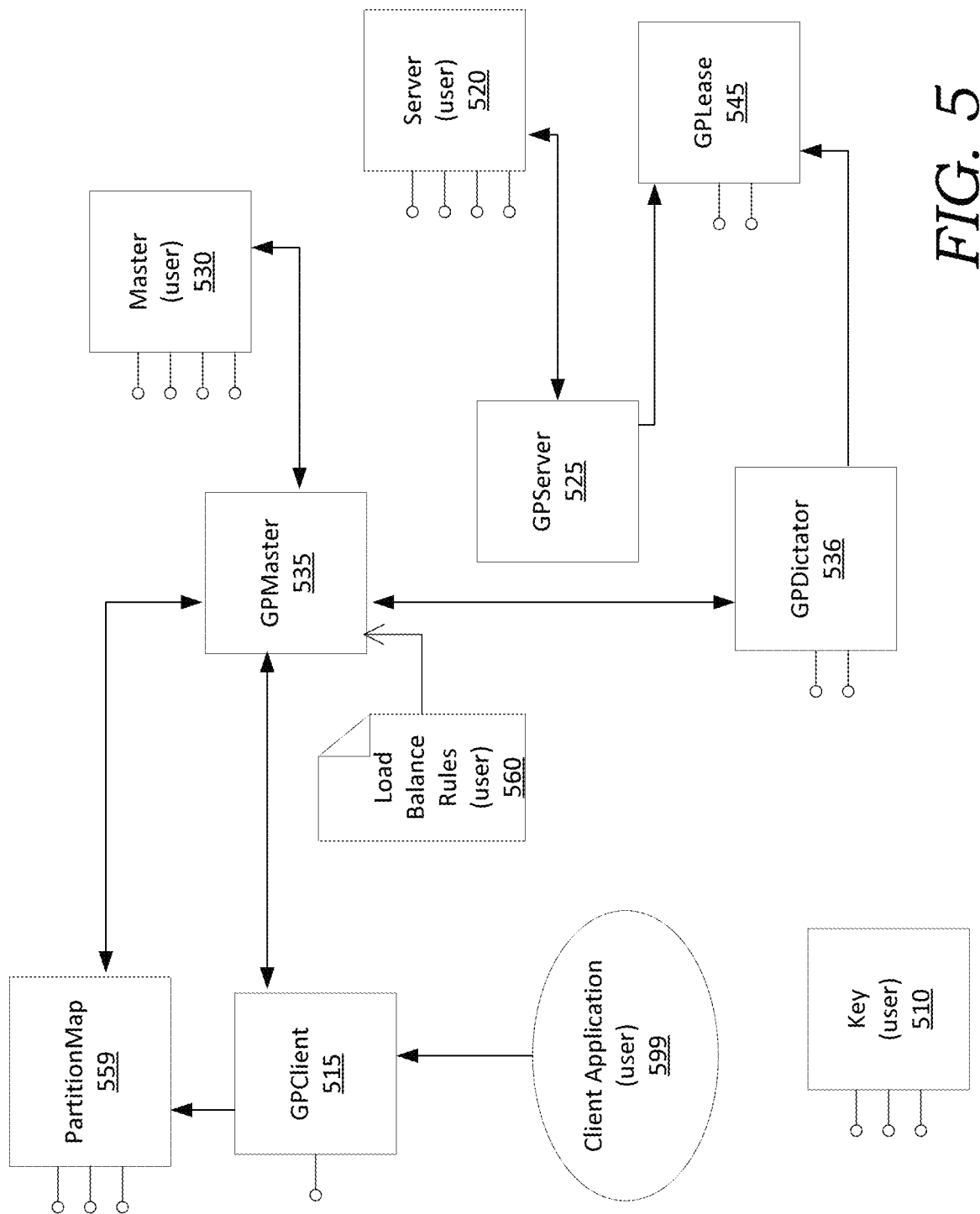
FIG. 5 shows an example of a generic partitioning environment, in accordance with aspects of the present invention.

FIG. 5 shows an example of a group of modules and/or interfaces for providing a generic partitioning framework according to the invention. FIG. 5 also displays examples of application-defined interfaces for providing computational jobs that can take advantage of the generic partitioning environment. In FIG. 5, although the key or namespace is provided by the user or application, the interfaces for partitioning a namespace are fixed interfaces provided by the partitioning system. This decouples partitioning of the namespace from performing the job or work item that operates on the data corresponding to the namespace.

In FIG. 5, there are at least two types of components or interfaces that are provided or designated by the user. The user provides a definition for a key (and corresponding namespace) 510 and a plurality of server interfaces 520 for the application. As described above, the key describes the namespace for the application. This allows the partitioning system to know the range of variables, states, and/or computations for potential partitioning. In addition to defining the key, the user also provides at least three interfaces related to the key. The interfaces related to the key 510 provide functions to serialize the keys in a namespace, to deserialize keys, and for comparing two keys. Since the user selects the namespace and key values, the operation of these interfaces is not offered as a fixed interface by the partitioning system. The interfaces related to keys and namespaces are instead provided by the user as application-defined interfaces.

The user also provides application-defined interfaces 520 that are used by server role instances. The application-defined interfaces for server role instances 520 include functions for what operations a server will perform when a server receives a request to operate on a key. For example, an interface for StartServeKeyRange can define one or more operations a server can perform when the server that starts serving a given key range. A corresponding interface for Stop ServeKeyRange can allow a server to end serving of a key range in an orderly manner. Additionally, it may be desirable to collect information from the server. An interface such as an OnReceivedHeartbeatRequest interface can define how a server will extract additional information from a heartbeat message received from a current partition master. Another interface such as BeforeSendingHeartbeatResponse can define what a server will include as additional information in a response to a heartbeat message. This can allow, for example, a server to communicate load information to a partition master for use in load balancing.

If a user includes additional functions or information as part of heartbeat (or other message) exchanges, the user can also provide a user defined interfaces for the master role 530. The user defined interfaces for the master role 530 are a complement to the fixed interfaces for the master role, schematically shown as GPMaster 535. The user defined interfaces for the master role 530 are not required.

In the embodiment shown in FIG. 5, the general partitioning environment is enabled by five modules and/or groups of fixed partitioning system interfaces. These include the fixed interfaces shown as being part of GPClient module 515, the GPServer module 525, the GPMaster module 535, the GPDictator module 536, and the GPLease module 545. Of course, other ways of arranging the modules, interfaces, and/or functions shown in FIG. 5 can also be used.

The GPClient module 515 shown in FIG. 5 has interfaces that allow for translation from a key specified by a client application or user 599 to the address for the server that will handle a user request. The interfaces for GPClient module 515 perform this lookup by consulting a partition map or partition table 559. The GPClient module interfaces can then, for example, return the server address corresponding to the key to the client application 599 so that the client application can direct the request to the correct server.

The GPServer module 525 has interfaces that work in conjunction with the application-defined interfaces 520 to perform desired user tasks. The GPServer module 525 includes interfaces for communication between master role instances and server role instances. The GPServer module interfaces also communicate with the interfaces for GPLease module 545 to manage the lease objects and lease contents associated with each server role instance.

The GPMaster module 535 provides interfaces for the core functions for managing master role instances. The interfaces for GPMaster module 535 handle election of a dictator from the master role instances, communication between a dictator and server role instances (such as via heartbeat messages), and partition management. The partition management can include providing updates to partition table 559. For load balancing, the interfaces for GPMaster module 535 can perform load balancing using an internal algorithm, or the GPMaster module can receive alternative load balancing expressions 560 that are provided by the user as an application-defined interface. Optionally, the messaging functions handled by the GPMaster module 535 can be performed by one or more separate messaging interfaces.

The GPDictator module 536 provides interfaces that handle functions related to a master role instance that will serve as dictator. The GPDictator interfaces can handle a master role instance claiming dictatorship (such as after winning the dictatorship in an election conducted by GPMaster module 535), releasing dictatorship (such as after a failover), and handling changes to sequence or epoch numbers in order to avoid stale updates.

The GPLease module 545 provides interfaces that manage leases within the generic partitioning environment. This can include allowing a master or server to acquire a lease on an associated storage object, on a partition, or on any other type of data structure where leases can be obtained.

Basic Master/Server Management Protocols

One way a partition master can communicate with partition servers is via a regularly sent keepalive ('ping') heartbeat. This heartbeat can be sent to all servers, including servers not serving any partitions. A server can respond to this keepalive heartbeat (or other types of heartbeat messages) with a list of the partitions that the server is currently serving. The heartbeat responses can be used in conjunction with server partition leases to allow a master to verify that a server is serving the correct partitions. When a server is serving one or more partitions, the server also maintains a lease on its own private storage object, such as a binary object or blob. When a server starts up it does not hold any lease—it will only do so upon the initial partition assignment. The storage object lease should also contain a listing of the partitions being served by a server. If either the heartbeat response or the information in a storage object lease differs from the partition information expected by the master, a conflict in partition information exists.

If a conflict occurs between a master and a server regarding the partitions being served, and if the server is attempting to serve one or more partitions, the conflict is considered a fatal error. As an example, the master may think the server is serving P1 and P2 whereas the server reports P2, P4 and P5. In this situation, the master will break the server's lease on the corresponding partition server blob. The master will then issue an alarm and rebuild the proper state for the partition table. This may involve terminating the master so that the proper state is rebuilt upon restart of the master.

It is also a conflict when the master and server differ and the server reports that no partitions are being served. However, this is not considered a fatal error. This can occur, for example, if the server fails over between two heartbeats, or is down during one or more heartbeats while still 'holding' the lease and then it restarts and responds to the next heartbeat. When a conflict occurs with the server reporting no partitions being served, the partition master can try to delete the server's storage object. If successful, any partitions can be reassigned to other available servers. However, deletion of the lease on the server's storage object may fail if the lease of the previous instance of the server has not yet expired. Thus, it may be necessary to retry the deletion for up to a lease period. Failure to delete the storage object after one lease period is a fatal error that can be handled as described above. When the master restarts it will ensure all unknown storage objects are deleted before proceeding with partition assignments.

Another potential failure situation is when a server is holding a lease but the server does not respond to a heartbeat (such as a 'keepalive') within some timeout period. Once again, the master can attempt to delete the server's storage object to resolve the conflict. If the storage object is successfully deleted, then the server is no longer functioning. Any partitions the server was serving can be reassigned to other servers. If the storage object cannot be deleted, the master can read the storage object content to check for conflicts between the master and server regarding partition assignments. If there is no conflict the server may continue serving, and the master can try to 'ping' the server again shortly via the normal heartbeat processing. Preferably, there is a limit to how long the master cannot communicate with a server via heartbeats before it breaks the server's lease on the storage object. If a conflict is detected, the conflict can be handled as described above.

For partition assignment the master piggy-backs a partition assignment request on the heartbeat to the relevant partition server (the heartbeat is accelerated in this case). A partition assignment request consists of the server storage object name plus the complete new list of partitions to be served. For example, to assign partition P2 to a server currently serving P1, the partition assignment consist of both P1 and P2. This makes unassignment orthogonal to assignment: to remove P1 from a server serving P1 and P2, simply send an assignment consisting of P2 only. The master has already updated the partition table when the partition assignment takes place. The partition table is only updated when (before) a partition is assigned to a server; when a partition is removed from a server no update is needed.

A partition server maintains a storage object lease that starts when the first partition is assigned to the server. The storage object lease is maintained until the server dies or the master forces the lease to be broken, such as due to a conflict between the assignment information for the server in the partition table and the assignment information reported by the server to the master. The storage object name is passed along with the partition assignment. All subsequent partition assignments will contain the same storage object name. When a server receives a partition assignment, a server without an existing storage object name will acquire the storage object name provided in the partition assignment. If the server already has a storage object with a name, the server can compare the name provided in the request with the existing name. If the names are different, the server can issue an alarm and terminate, as the different names indicate a conflict in partition assignment information. After receiving the partition assignment, the server can write any associated information into the storage object for the server. The associated information can include, for example, key ranges to serve, the epoch number for the dictator, and/or the epoch number for the partitions. The server can then respond to the master that provided the partition assignment, start serving any new partitions, and stop serving any removed partitions.

After a partition assignment, a master role instance will expect a response from the server that confirms the assignment. If the response does not match the assignment, or if the response is delayed, the master role instance can terminate the lease for the server. Alternatively, the master role instance can investigate the blob for the server to determine the server status. For example, if the server's storage object indicates that the assignment has succeeded, and if the response is merely delayed or lost instead of inaccurate, the master role instance can wait and see if the server responds correctly to a subsequent heartbeat or other message. If errors are found and the master is not able to break the storage object lease for the server, the master can terminate to force a reconstruction of the partition map by a new master role instance.

Additionally, a server role instance can provide statistics for each range (i.e. partition) it is serving. The statistics are opaque to the general partitioning system, and can be represented as a property bag of name/value pairs. These optional statistics can be incorporated into load balancing formulas, including load balancing formulas provided by a user.

When the master becomes the active master or dictator, it first obtains a new epoch number from the storage object on which it is keeping a lease. It then collects three pieces of information in order to build its view of the system, and to correct any information that is inconsistent. First, the master reads the partition table. The partition table contains the truth about which partitions exist. Preferably, the master obtains a lease on at least the relevant part of the partition table prior to reading the partition table in order to prevent stale writes by a previous master. Next, the master obtains a list of all existing server storage objects. This can be done by maintaining a list of server storage objects, by requiring that all server storage objects are located in a specified location, or by another convenient method. A heartbeat or another type of message is also used to query each server regarding the server's current partition assignments. This query can include a query for the name of the storage object for a server. Note that the above tasks can proceed in parallel.

Based on the collected information, the master can identify any inconsistencies between the assignments in the partition table and the assignments reported by each server. If a mismatch is present, one or more corrective actions can be taken, such as breaking the lease of a server on the server object and restarting the master. Additionally, if any server storage objects are identified that are not mentioned in the partition table, these storage objects can be deleted. Finally, any assignments in the partition table that are not confirmed by a server can be queued for assignment to a new partition server. After resolving the conflicts, the master can start normal heartbeat processing, assigning of partitions, and any other master functions.

Load Balancing

Load balancing can roughly be divided into three activities. Load balancing can include moving a partition from one server to another, splitting a partition into multiple partitions, or merging multiple partitions into a single partition. Typically, changing a partition assignment from a first server to a second server will be in response to the first server having a sufficiently high load based on one or more metrics. If a single partition accounts for a large amount of load, splitting of the partition can be used to allow a large load to be divided among multiple servers. Merging of partitions allows partitions that have lower amounts of activity to be combined. This reduces the overhead required to track and maintain the various partitions for a data set. Optionally, a user can define an upper limit on the number of partitions for a namespace. The thresholds for initiating a merge of partitions can be reduced as the number of partitions approaches the upper limit. The upper limit for number of partitions can be dynamically configured.

As an example of determining when to split or move a partition, all partitions for a namespace can be sorted based on load. The load can refer to one or more metrics related to performing calculations for a partition. Thus, the load can refer to overall CPU usage for a server or an individual partition; storage used for a server or partition; a number of requests received by a server overall or for a single partition;

or any other convenient value that indicates the amount of work being performed by a server and/or for a given partition. Based on the load, the top N partitions which have a higher load than a configurable multiple of the average partition load can be split. N is dynamically configurable. For example, it can be a function of the current number of partitions in the system, such as based on a logarithm of the current number of partitions, or it can be a function of the maximum allowable number of partitions in the system. Additionally or alternately, the load of each server is calculated by adding together the servers' partition loads. The servers can then be sorted by load, and the top N servers with a load greater than some configurable multiple of the average are chosen for movement of partitions between servers. Similarly, a plurality of servers with loads below the average load are selected to receive partitions from higher load servers. Preferably, moving a partition from a first server to a second server is performed to reduce the load of the first server to a value closer to the average load without causing the load of the first server to be below the average load. This is easier to do if all partitions have reasonably similar load. Splitting partitions as described above can be used to reduce the disparity in loads between partitions.

As noted above, the load for a partition can be derived from statistics collected by the server role instances. This information is passed to the master role instance, such as via heartbeat messages at regular intervals. Preferably, the load statistics are defined so that a load metric is additive. This allows the load for a server to be determined based on summing the loads for the individual partitions on the server. One or more formulas for determining the load for a partition and/or a server can be stored in a separate blob or other storage area. The rules or expressions for partitioning can be default rules provided by the generic partitioning environment, or a user can provide rules and/or expressions.

For load balancing rules and/or expressions provided by a user, a user can first identify one or more metrics that are desired as load balancing metrics. Examples of suitable metrics include CPU usage, network bandwidth usage, number of requests processed per time period, or any other convenient metric. Some metrics may be specific to a partition while other metrics may correspond to a value for all partitions on a partition server. Based on the desired metrics, a user then provides one or more interfaces for collecting the desired metric on each server. Optionally, common metrics such as CPU usage or number of requests per time period can be provided as standard interfaces that are simply accessed by a user. The collected metrics are then passed from partition servers to the corresponding master using messages, such as a heartbeat message used by a server to verify the current status of a server with the master.

For each metric identified by a user, a series of values recognized by the general partitioning system can be calculated. As an example, the general partitioning system can recognize "dimensions" as variables that are defined by a user. A dimension in the general partitioning system can have an expected format. The dimension can include an expression for a PartitionMetric corresponding to the value of the metric over a partition. Another expression can be for a ServerMetric, which corresponds to the value of the metric over all partitions on the server. Still another expression can be for a Condition value for the metric, which defines a situation where an action is taken.

In a simple situation, CPU usage can be defined as a dimension by a user. In this example, the CPU usage dimension is used to determine when a server is sufficiently busy that a partition should be moved to another server. In the dimension defined by the user, the percentage of CPU usage on a virtual machine dedicated for processing requests for a given partition is defined as the PartitionMetric. The sum of CPU usage percentages over all partitions on the virtual machine can be defined as the ServerMetric. In this example, the Condition can be defined as ServerMetric usage being greater than 80% of total CPU usage. When this Condition occurs, a partition can be moved to another server. The partition for movement is selected based on the PartitionMetric. It is noted that the PartitionMetric and ServerMetric are both defined by the user. Thus, a user is not required to have a PartitionMetric that is analogous to the ServerMetric. For example, the ServerMetric could be a combination CPU usage and network bandwidth usage, while the PartitionMetric is only related to request rate.

In addition to defining dimensions for reassignment of partitions, a user can also define dimensions for triggering a partition split. The definition of the dimension for triggering a partition split can be similar to the dimension for a reassigning a partition, or a different format of dimension can be used. For example, a ServerMetric expression may not be necessary for a dimension for triggering a partition split, since a PartitionMetric expression will more likely be useful for determining when to split a partition. Additionally, a dimension for triggering a partition split could include a dimension for how to split a partition when a Condition for splitting the partition is satisfied. It is noted that the dimensions for triggering a partition split may also be useful for identifying when to merge two partitions. Alternatively, a user can define separate dimensions for partition merging.

More generally, any convenient number of conditions can be specified for determining when a load balancing action should occur. The conditions can incorporate metrics corresponding to one or more dimensions, such as metrics corresponding to a plurality of dimensions. The conditions can be ordered, so that the conditions are evaluated in a specific order for performing load balancing. For example, a condition related to splitting a partition can be placed earlier in the order than a condition for moving partitions to different partition servers. In such an example, if one partition on a partition server is responsible for a large percentage of the load, moving other partitions might not be effective for balancing load among a plurality of servers. By checking for whether to split the partition first, the partition causing the problem can be split into portions with (presumably) lower loads. Similarly, it may be desirable to merge partitions early in an ordering of conditions. For example, a partition server with a large number of low load partitions might appear to be unavailable due to an excessive number of partitions, even though the overall load on the server is below average. Merging partitions before moving assignments allows such a server to become available for receiving an additional partition assignment.

When specifying a condition for initiating a load balancing activity, any convenient type of metric may be included in a condition. Thus, metrics for load on a single partition, load on a plurality of partitions, load on a server, or load on a plurality of servers may be used together or separately as desired. For metrics related to a plurality of partitions or plurality of servers, a simple example is to determine the load across all servers in order to define an average load. A condition for performing load balancing could then be related to a difference between load on a server versus average server load, such as a difference in the absolute value of the server load versus average load, or a comparison of the server load with a standard deviation from the average server load. When using a plurality of partition loads, it may be desirable to consider the load for a number of the highest loaded partitions on a server in relation to each other. The desired load balancing action may be different for a partition server with multiple partitions that have a similar load as opposed to a partition server with only one high load partition.

In addition to defining dimensions for partition reassignment, splitting, and merging, a user can also define one or more filters for constraining actions on partitions based on the dimensions. For example, it may be desirable to prevent a server from a receiving a new partition assignment when the server has either a CPU usage ServerMetric of more than 70% or the number of partitions is greater than 10. An AssignmentFilter value can be defined that prevents such assignments. Other examples of potential filters include filters for preventing the movement of a partition from an existing partition server, preventing a split of a partition, or preventing a merge of a partition. Depending on the type of filter, a filter may prevent a load balancing action from occurring. Alternatively, a filter can modify the order of consideration of conditions, or the filter can cause a condition to be skipped entirely during a load balancing calculation cycle.

As an example, consider a hypothetical system where all server requests consume the same amount of resources. In such a system, a reasonable load metric could be based on the request rate. In this example, each server role instance collects an average of the request rate over a longer time period (RR_SlowMA) and an average of the request rate over a shorter time period (RR_FastMA). These request rate averages are transmitted back to the master role instance as name/value pairs in a property bag. A simple load metric could then be defined as a formula in the load balancing rules as PartitionMetric=max(RR_FastMA, RR_SlowMA). The left hand side of the PartitionMetric for the dimension "load" corresponds to an identifier recognized by master component within the partitioning system. In this case, the dimension "load" would be identified in advance by the user. The right hand side can be any arbitrary expression that generates a load value that is assigned to the PartitionMetric. In this case, the load corresponds to the number of requests based on one of a plurality of moving averages. Based on the PartitionLoad value and/or other values, one or more Conditions can be defined regarding whether partitions should be split, merged, or moved between servers.

More generally, a user can define any combination of metrics and expressions (such as conditions) for making load balancing decisions. The expressions defined by a user for making a load balancing decisions can also include conditional logic and/or support for multi-dimensional constraints/optimization goals. Thus, a user can define a decisions tree or use other conditional logic to provide an ordering for how and when expressions are evaluated. For example, a user could have a first expression evaluated, and then select from a plurality of potential additional expressions to evaluate based on the value of the first expression. This could be based on an "if-then-else" type of conditional logic, a lookup table for the next expression based on a determined value, or any other convenient type of conditional logic. As a result, a user has flexibility to specify the types of metrics and expressions for use in load balancing, including whether a given expression is evaluated as well as providing an order for evaluating such expressions. Note that the order of evaluation for expressions can also be determined dynamically based on the value of previously evaluated expressions.

Another example of expressions defined by a user for making load balancing decisions may include multi-dimensional constraints/optimization goals. For example, a user may defined multiple dimensions (e.g., two), and for each dimensions the user may define a separate optimization goal or constraint. CPU utilization and request latency are two exemplary dimensions. The user may specify rules such that a partition servers' CPU usage is below a first threshold (e.g., 90%) and at the same time minimize an average request latency across a defined set of partition servers (e.g., all partition servers). This approach may differ from an if-then-else type logic where users specify exactly what to do. In this model, users define limits and optimization goals, which allow the system to find a solution automatically.

In another hypothetical system, a user can provide a plurality of conditions or expressions for evaluation. The expressions are based on various CPU usage metrics for the partition servers that a serving a given namespace. A first expression evaluates whether any partition server has a CPU usage related to the namespace of greater than 60%. For this user, if no CPU has a usage greater than 60%, the user does not desire load balancing. Thus, if the result of the first expression is false (i.e., no partition server has a CPU usage greater than 60%), then no further expressions are evaluated, as load balancing is not desired. If at least one partition server has a CPU usage greater than 60%, a series of expressions can then be evaluated to determine a load balancing action to perform.

In a situation where load balancing results in moving a partition, a partition can be moved from a first server to a second server by having the master role instance issue two assignment requests. An assignment request to the first server does not include the partition, which results in the first server stopping service for the partition. A second assignment request to the second server includes the partition.

In a situation where a partition is split into two or more partitions, a master role instance can initiate a split by determining a split key, which corresponds to a key value that will form the end of the inclusive range for one of the new partitions. The split key can be selected in any convenient manner A master or server role instance can select a split key based on the partition, such as by selecting a key value at or near the middle of the range of the partition. Alternatively, a server can select a split key based on additional statistics regarding the partition. For example, a sampling-based bucket mechanism could be used to track the load for various portions of the partition in a manner similar to determining the load for the full partition. The split key can then be selected so that the load is similar for the buckets assigned to the new partitions.

Within a given role, the (active) master is responsible for spreading the load across the partition servers. Preferably the master will prevent one or more servers from becoming overloaded and thus unable to process requests. In an alternative embodiment, adjustments of load could be done by keeping one partition/range per server and adjusting these ranges. By instead moving partitions, an adjustment to the load can be performed while impacting a smaller number of servers.

It is often desirable to have a minimum number of partitions per server so that load can be moved around smoothly via partition reassignments. When the number of partitions falls to the minimum level, further mergers are not performed. Similarly, it is often also desirable to avoid having too many partitions. As the maximum number of partitions is approached for a server, the likelihood of merging partitions can increase. As an example, it may be desirable to maintain between 5 and 8 partitions per server. Of course, the various embodiments of the invention can work with any number of partitions per server, such as from as few as 1 partition per server to hundreds or more per server.

Preferably, both the split and merge protocols are stateless. Either the master or the involved server(s) may fail over at any time without causing an error for the partitioning system. In other words, if either the master or a server fails during the split or merge process, the next master or server will be able to construct a valid list of partition assignments regardless of when the failure occurred. In a stateless split protocol, the participating server is not required to perform any of the split actions. As an example, a partition table can include a partition on a server S1 that ranges from a low key value of D to a high key value of H. In this example, the epoch number for the partition is 2. Based on user-defined load balancing equations, it is determined that the partition should be split, so that part of the partition can be assigned to another server. The master role instance asks server S1 for a split key. The server S1 returns a key of G as the split key. The master then modifies the partition table. In place of the single entry noted above, the table now contains two partitions. One has a low key value of D and a high key value of G, while the second partition has a low key value of G and a high key value of H. As noted above, the partition range definitions based on a low key value and high key value are inclusive of the low key value and exclusive of the high key value. The change in the partition table can occur by modifying the existing entry and adding a new entry, by removing the existing entry and adding two new entries, or by any other convenient method.

At the next heartbeat cycle, the master detects a conflict between the partitions served by server S1 and the information in the partition table. Because a split has just occurred the master does not terminate the blob lease of the server S1. Instead, the master sends an assignment to server S1 with a partition range of D to G and an epoch of 3. This modifies the assignment of the partition at S1 to match one of the split partitions in the partition table. After receiving an acknowledgment of the new assignment from server S1, the master can assign the second split partition to another server. The second split partition would also have an epoch number of 3. Alternatively, both of the split partitions can be assigned to server S1 initially, with one or both partitions being moved at a later time to perform load balancing.

Merging of two partitions can also be handled in a stateless manner. When partitions are merged, as an initial step the partitions for merger are unassigned from the current server. For example, a first partition on server S2 can have a low key value of K and a high key value of M. In this example, the epoch number for the first partition is 7. A second partition on server S4 can have a low key value of M and a high key value of N. The epoch value for the second partition is 9 in this example. As an initial step, the partitions can be unassigned from their respective servers, so that the partition table shows a non-assigned value for the server. The two partition entries are then replaced with a single entry having a low key of K and a high key of N. The epoch number assigned to this partition is one greater than the highest value of the merged partitions, which corresponds to 10 in this example. The new partition can then be assigned to a server.

Additional Examples

In order to provide context for describing the invention, an example of organizing computing resources in a distributed network or cloud computing environment is provided. The following description of a cloud computing environment is provided as an illustrative example. Those of skill in the art will recognize that the claimed invention can be used in conjunction with distributed network environments with alternative types of organization. The definitions below are used within the illustrative example.

A "client" is defined as a role that issues one or more requests for action by a application-defined interface against a namespace or domain. A client can correspond to a user or to a process initiated on behalf of a user. For example, a request to a lookup a particular account corresponds to a request directed to an application for account lookup that is made against the domain of all accounts with a key corresponding to the desired account.

A "work item" is a static representation of a job to be run in the cloud computing environment. A work item can specify various aspects of a job, including job binaries, pointers to the data to be processed, and optionally the command line to launch tasks for performing the job. In addition, a work item may specify the reoccurrence schedule, priority and constraints. For example, a work item can specify to be launched every day at 5 PM.

A "job" is a running instance of a work item. A job contains a collection of tasks that work together to perform a distributed computation. The tasks can run on one or more virtual machines in the cloud computing environment.

A "task" is the fundamental execution unit of a job. Each task runs on a virtual machine. Users can specify additional input to the command line and pointers to input data for each task. A task may create a hierarchy of files under its working directory on the virtual machine performing the task during the course of execution of the task.

A user of a cloud computing environment will typically desire to perform jobs using the cloud computing resources. The jobs will typically involve performing jobs on data that is stored in locations that are accessible via the cloud computing environment. One way for an operator to provide a cloud computing environment is to provide the environment as a number of layers. FIG. 1 schematically shows an example of a system suitable for performing tasks within a cloud computing environment. The system in FIG. 1 includes a task runtime layer 110, a third party task runtime layer 120, a resource management layer 130, and a scheduling and execution layer 140.

In the embodiment shown in FIG. 1, the task runtime layer 110 is responsible for setting up the execution environment and security context for tasks from a user 105. The task runtime layer 110 can also launch tasks and monitor the status of the tasks. The task runtime layer 110 can take the form of a system agent running on each virtual machine. The task runtime layer may also include a runtime library that can be linked into a users' task executables. Having runtime libraries as part of the task runtime layer 110 can potentially provide richer capability to tasks executed by the system agent. Examples of runtime libraries include one or more efficient communication libraries to allow fast communication among tasks; an efficient remote file access library support to read files from other virtual machines and/or other tasks; a checkpoint library to allow tasks to checkpoint (e.g. into binary large objects) and resume; a logging library; and a library for providing a distributed file system to be used across virtual machines performing a given task within a pool of virtual machines.

The third party task runtime layer 120 allows additional runtimes to be built and run on top of task runtime layer 110. The third party task runtime layer 120 also can provide additional capabilities for coordinating the running of tasks for a job. Examples may include a MapReduce runtime to a library for providing a distributed file system to be used across virtual machines performing a given task within a pool of virtual machines. This allows a user to organize the cloud computing environment in a manner tailored for the user's jobs or tasks. In some embodiments, a job manager task can facilitate allowing a user to use a third party runtime layer to run and/or control cloud computing resources.

Resource management layer 130 deals with managing the computing resources available in the cloud computing environment. One option is to have the resource management layer 130 manage the resources at three different levels. At a first level, the resource management layer 130 manages the allocation and deallocation of virtual machines associated with a job (i.e., execution of a work item) as well as the files stored on each virtual machine associated with a task. At a second level, the virtual machines associated with a job can be grouped into pools of machines. A pool can contain virtual machines associated with one or more jobs and/or work items. Depending on the embodiment, a single pool can span across multiple virtual machine clusters, such as all virtual machine clusters in a data center, a plurality of virtual machine clusters across a plurality of data centers within a geographic region, or a plurality of clusters across data centers in a plurality of geographic regions. A single pool can contain a large number of virtual machines, such as millions. The virtual machines can be contained in a large number of pools, such as up to billions. At a third level, the resource management layer manages the amount of virtual machines available for association with jobs or work items in a given group of pools. This allows for dynamic adjustment of the amount of compute resources used based on the current load of the system. Additionally, virtual machines that are not being used by a current group of pools may be released back to the cloud computing environment for incorporation into other groups of pools.

In the embodiment shown in FIG. 1, scheduling and execution layer 140 manages work items, jobs, and tasks that are being performed by a user. The scheduling and execution layer 140 makes scheduling decisions and is responsible for launching jobs and tasks as well as retries on failures. Such a scheduling and execution layer 140 can include components for managing jobs and/or tasks at various levels.

Figure 2:
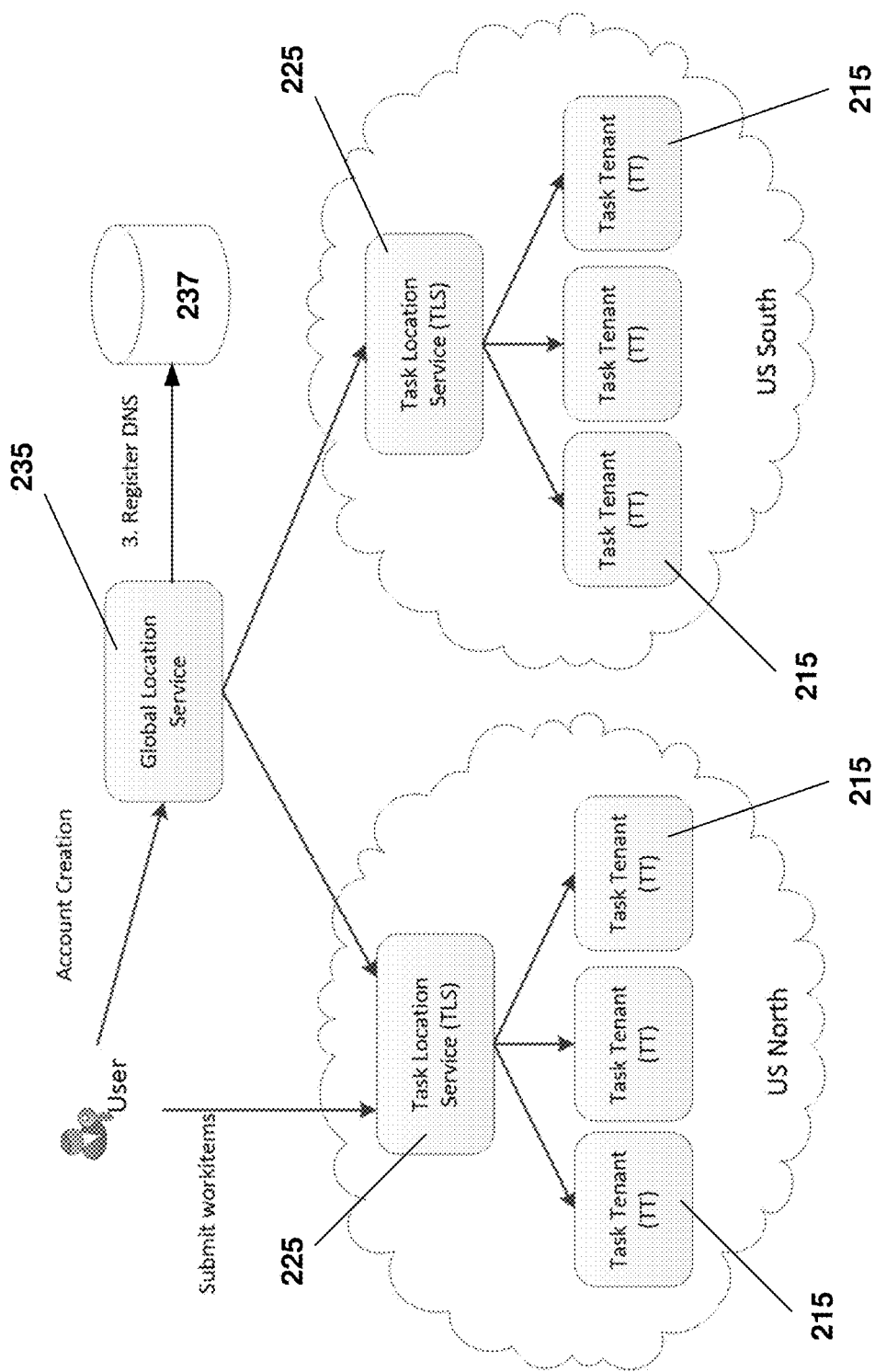

The layers described above can be implemented in a cloud computing environment that includes processors at multiple geographic locations. FIG. 2 schematically shows an example of how processors at different locations can be integrated within a single cloud computing architecture.

In FIG. 2, one or more task tenants 215 can be used to manage pools of virtual machines. A task tenant 215 can maintain a set of virtual machines. The jobs of one or more users can run on the virtual machines within a task tenant 215 as part of one or more pools of virtual machines. One or more task tenants 215 can be used in a given geographic region. The responsibilities of a task tenant 215 can include maintaining the set of virtual machines and dynamically growing or shrink the task tenant based on the resource utilization within the task tenant. This allows a task tenant 215 to increase the number of virtual machines within the task tenant to accommodate increased customer demand. This also allows a task tenant 215 to release unused virtual machines so that the virtual machines can be allocated to other hosted services in the data center handling service for other customers. Another responsibility of a task tenant 215 can be implementing part of the pool allocation/deallocation/management logic. This allows the task tenant 215 to participate in determining how virtual machines are assigned to pools associated with a task for a customer. The task tenant 215 can also be responsible for scheduling and execution of tasks on the virtual machines within the task tenant.

In the embodiment shown in FIG. 2, one or more task location services 225 are provided that control a plurality of task tenants 215. The plurality of task tenants can correspond to all task tenants in a given geographic region, various task tenants from around the world, or any other convenient grouping of task tenants. In FIG. 2, task location services 225 are shown that serve regions labeled "US North" and US South". The responsibilities of a task location service 225 can include management of task accounts for the given geographic region. The task location services 225 can also provide application programming interfaces (APIs) for allowing users to interact with the cloud computing environment. Such APIs can include handling APIs associated with pools of virtual machines, pool management logic, and coordination of pool management logic across task tenants within a given geographic region. The APIs can also include APIs for handling tasks submitted by a user, as well as maintaining, scheduling, and terminating work items or jobs associated with the user tasks. The APIs can further include APIs for statistics collection, aggregation, and reporting for all work items, jobs, tasks, and pools in a geographic region. Additionally, the APIs can include APIs for allowing auction of available virtual machines as pre-emptible virtual machines to users on a short term basis based on a spot market for virtual machines. The APIs can also include APIs for metering usage and providing billing support.

The task location services 225 can be linked together by a global location service 235. The global location service 235 can be responsible for account creation and management of accounts, including managing task accounts in conjunction with the task location service tenants 225. This includes being responsible for disaster recovery and being responsible for availability of work items and jobs if there is a major data center disaster. This may include running a work item or job in a different location due to a data center not being available for any reason. This can also include allowing customers to migrate their work items, jobs, and pools from one data center to another data center. Typically there will be only one active global location service 235. This active global location service 235 is in communication with the various task location services 225 as well as service components for managing data storage (not shown). The global location service can maintain a global account namespace 237.

Figure 3:
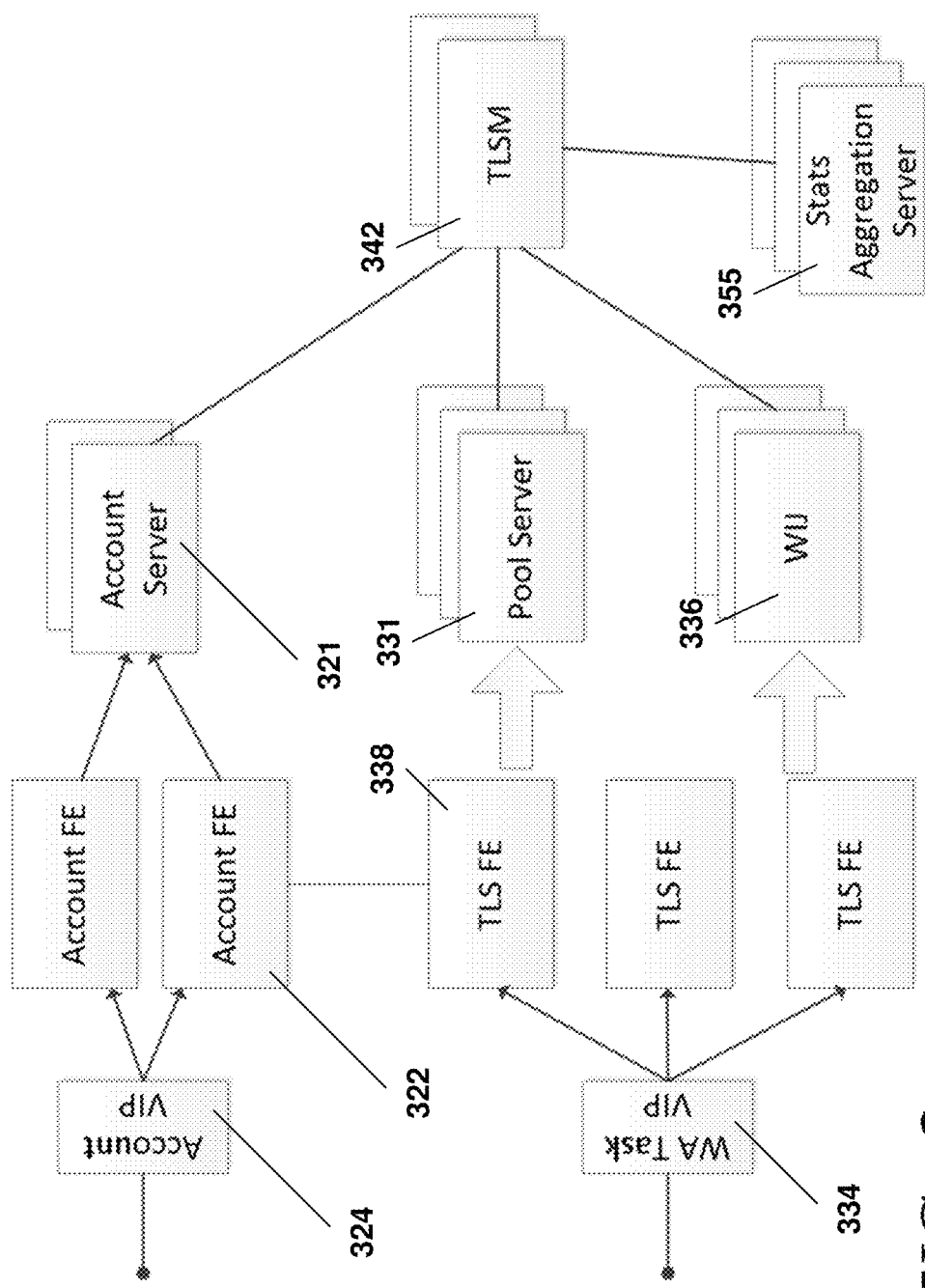

FIG. 3 shows a potential configuration for a task location service. In the configuration shown in FIG. 3, a task location service can include one or more account servers 321. The account servers handle account management for accounts in a given geographic region, including creation, deletion, or property updates. Account front ends 322 serve as the front end nodes for account service. The account front ends 322 are behind an account virtual IP address 324 as shown in the figure. The account front ends 322 process the account API requests coming from global location service, such as API requests to create accounts or delete accounts.

The configuration in FIG. 3 also includes one or more pool servers 331. A pool server 331 handles pool management and pool transactions for pools of virtual machines in a given geographic region. A pool server 331 handles pool creation, deletion and property updates. A pool server 331 also manages the high level virtual machine allocation algorithm across multiple task tenants. Virtual machine allocation can take into consideration the connectivity of a virtual machine with storage for a given user. The pool server may also perform other tasks related to allocation of virtual machines.

The configuration in FIG. 3 also includes one or more work item or job servers (WIJ) 336. WIJ servers 336 handle creation, deletion, and updates of work items and jobs. In addition, if a user has requested automatic creation and/or destruction of pools when work items or jobs start or finish, the WIJ servers 336 may initiate the creation and deletion of pools associated with the work items or jobs. The WIJ servers 336 also use generic partitioning mechanisms for scaling. In an embodiment, there are multiple WIJ servers 336 in each task location service, and each of the WIJ servers handles a range of work items.

The pool servers 331 and WIJ servers 336 receive requests from users via task location service front ends 338. The task location service front ends 338 are also responsible for calling corresponding components to process requests from users. The task location service front ends 338 are behind an account virtual IP address 334 as shown in the figure.

The configuration in FIG. 3 further includes a task location service master 342. In an embodiment, the task location service master 342 has two main responsibilities. First, the task location service master 325 serves as a master system for implementing partitioning logic for the corresponding servers in a task location service 225. Additionally, the task location service master 342 can be responsible for computing the new market price for preemptible virtual machines at the beginning of each spot period for the entire geographic region of the task location service. It can collect current bids and resource availability information from the pool servers and task tenants, and computes the new market price accordingly. Alternatively, the task location service master can send the bid and resource availability information to a spot price market service. It also makes high level allocation guidance to pool servers about preemptible virtual machines across all task tenants in a geographic region.

In order to track the activity and behavior of the computing environment, a task location service master 342 can communicate with one or more statistics aggregation servers 355. The statistics aggregation servers are responsible for collecting and aggregating detailed statistics for tasks, jobs, work items and pools. The other components in the system emit fine-grained statistics for tasks and virtual machines. The statistics aggregation servers aggregate these fine-grained statistics from task level or virtual machine level statistics into work item, account level, and/or pool level statistics. The statistics can be exposed for use via an API. In addition, the statistics aggregation servers can be responsible for generating hourly metering records for each account for use in billing.

As a more specific example, generic partitioning can be applied to the roles and sub-roles in the task location service shown in FIG. 3. The top level role demonstrated in FIG. 3 is a task location service or tenant. If multiple instances of the task location service are present, one of the instances will correspond to task location service master (or dictator) 342. Within the tenant are an account server role 321, a pool server role 331, and a work items-jobs server role 336. Each of these roles also represent instances of the task location service, but these role instances handle a set of functions within the overall tenant. For example, a request for account information is handled by the account server role within the tenant. If multiple instances of the task location service or tenant are present, the master for each of the roles within the tenant can correspond to a different instance.

Figure 6:
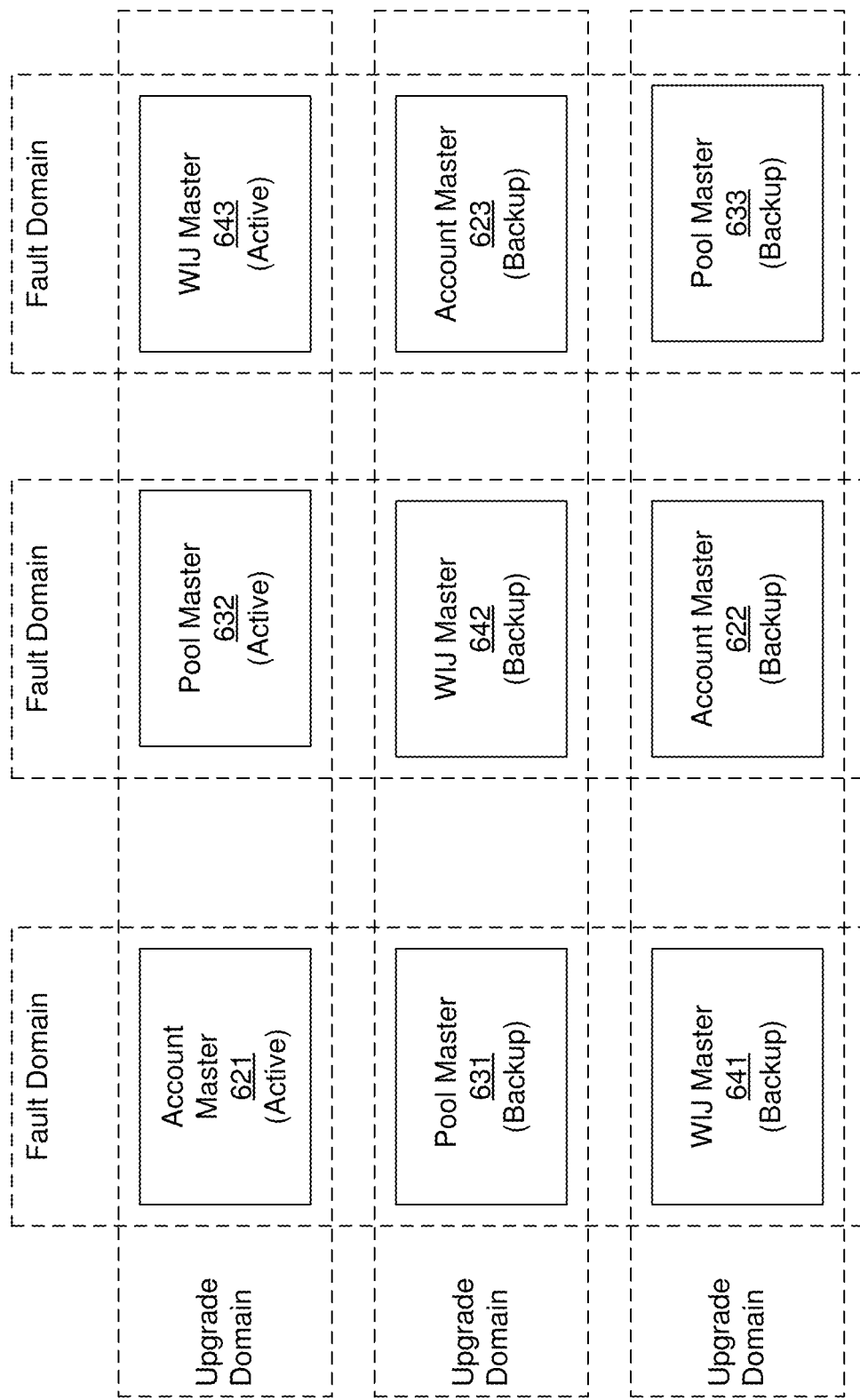
FIG. 6 shows an example of providing backup machines for active master roles among, in accordance with aspects of the present invention.

FIG. 6 shows a conventional example of how redundancy can be provided for multiple master roles. In this conventional example, each master role needs to have two additional instances in order to improve availability. A fault domain includes nodes that have common failure patterns and they may fail together. For example, nodes on the same rack sharing the same power supply may be in a common fault domain as they may fail as the result of a common problem. An upgrade domain corresponds to a set of nodes that may be taken offline at the same time during a system upgrade. These roles are spread across different "fault domains" and "upgrade domains" as illustrated in FIG. 6 so as to not be down at a common time as a result of an upgrade or a failure.

Under the conventional method, providing the additional instances needed for the three roles within a task location service would require having separate additional instances for each role. In FIG. 6, this shown by having an explicit machine that provides the additional instances for each type of master. Thus, the master 621 for the account servers would require additional instances 622 and 623. Similarly, master 632 for the pool servers has backup instances 631 and 633. Master 643 for the WIJ servers has backup instances 642 and 641.

Figure 8:
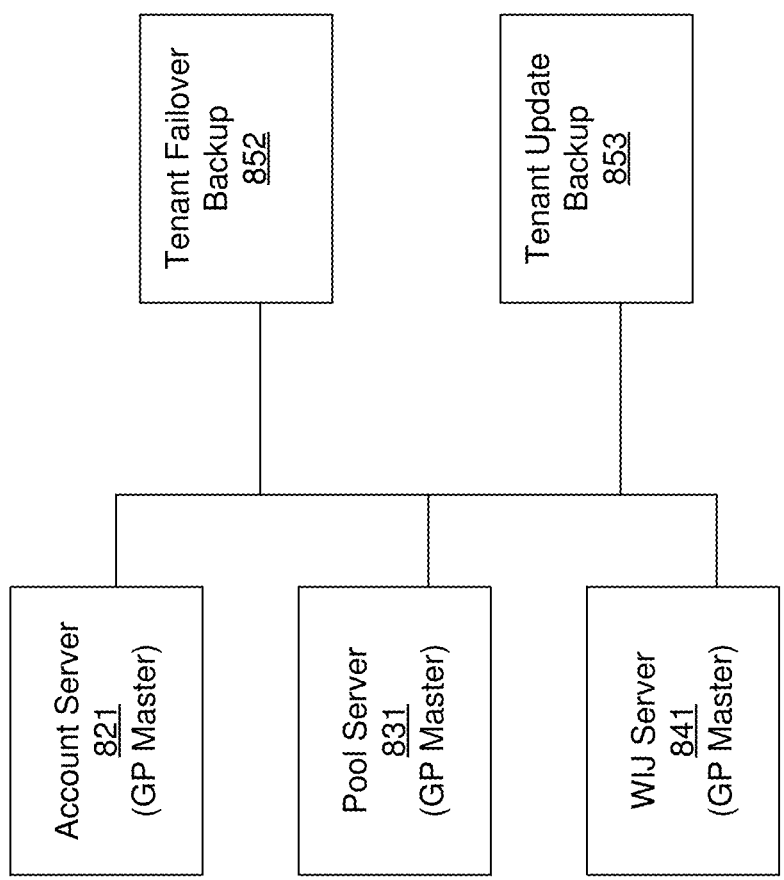
FIG. 8 shows another example of providing backup machines for master roles, in accordance with aspects of the present invention.

FIG. 8 shows an example of how virtual machines in a distributed computing environment using generic partitioning can be organized to provide the various instances and masters for a role. In FIG. 8, separate GP Masters 821, 831, and 841 are shown for account servers, pool servers, and WIJ servers respectively. Since the GP Master module and any fixed interfaces are the same regardless of the role being managed, the backup server needs for the GP Masters 821, 831, and 841 can be combined on a single machine. Thus, a single backup 852 can be provided as the backup for the three GP Masters. If one of the GP Masters 821, 831, or 841 experiences a failure, the same GP Master module and fixed interfaces may be used. The only additional information types, in this example, needed by the failover backup to take over the GP Master role that experienced a failure are the key for the corresponding namespace and any application-defined interfaces. Similarly, a single second backup 853 can be used for all three of GP Masters 821, 831, and 841. Consequently, in this example, only two GP Master backup servers (852 and 853) are used for the at least three GP Master roles. Although three GP Master roles are shown as being backed up by common machines, any convenient number of GP Master roles belonging to the same user or account could be backed up using a common machine.

Figure 12:
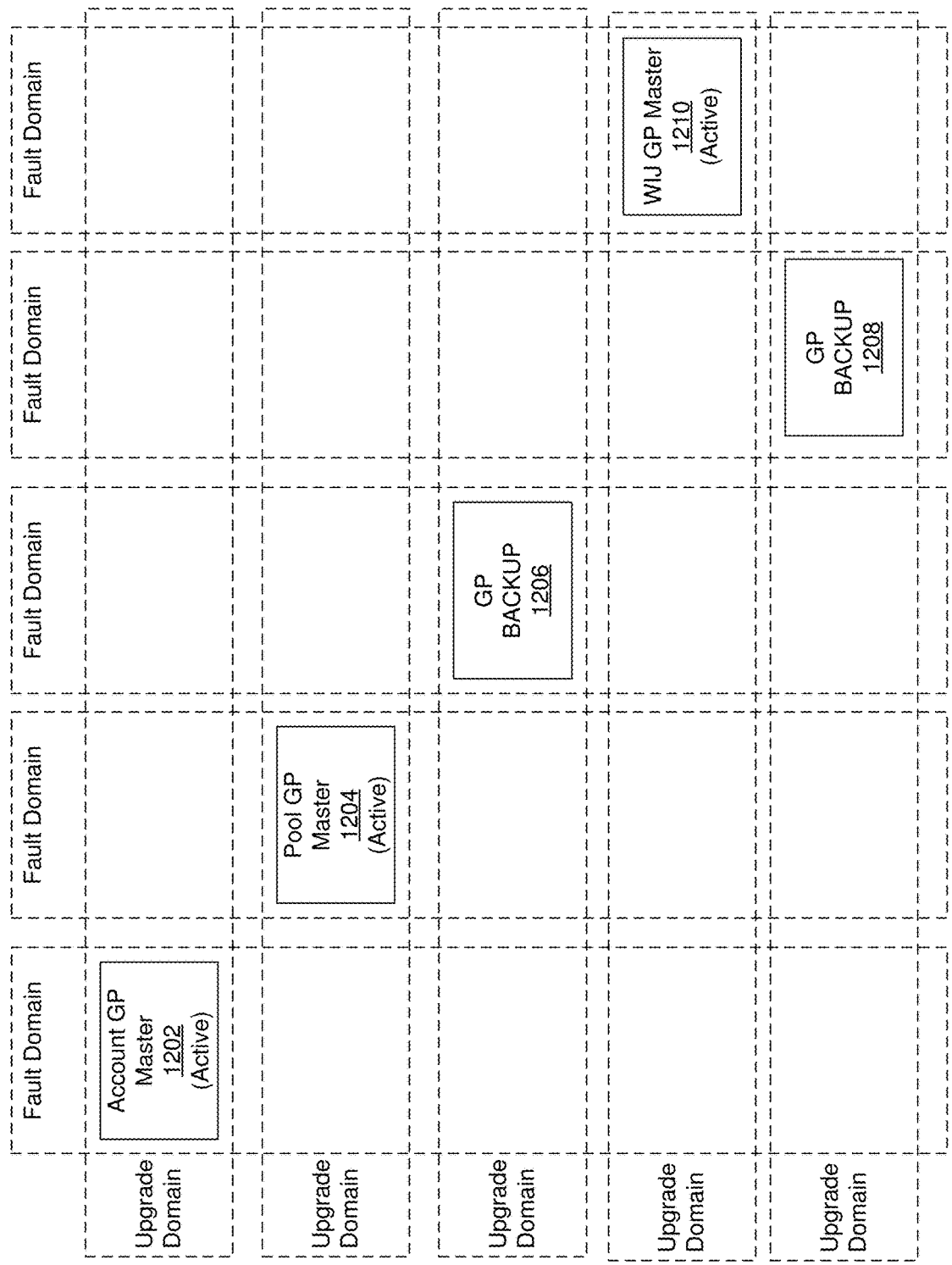
FIG. 12 shows an exemplary aspect of providing backup machines for master roles relative to fault domains and upgrade domains, in accordance with aspects of the present invention.

FIG. 12 shows an exemplary aspect of providing backup machines for master roles relative to fault domains and upgrade domains, in accordance with aspects of the present invention. Similar to those concepts discussed hereinabove with respect to FIG. 8, multiple GP Master roles may be backed up on a fewer number of servers. For example, FIG. 12 depicts an Account GP Master 1202 in a first fault domain and a first upgrade domain, a Pool GP Master 1204 in a second fault domain and in a second upgrade domain, a WIH GP Master 1210 in a third fault domain and in a third upgrade domain, a first GP Backup 1206 and a second GP Backup 1208. The first GP Backup 1206 and the second GP Backup 1208 are each in different fault domains and upgrade domains from the GP Master roles. In this illustrative example, a single Generic Partitioning system, which in this example only requires five servers (or potentially four servers with a single backup) to host all of the masters for the three roles. In the example illustrated in FIG. 6, nine different servers may be required for those same three master roles. The approach illustrated in FIG. 8 may be accomplished through the utilization of two additional servers that can be used for any type of role being hosted by the system. Consequently, a backup server (e.g., GP Backup 1206) may be used if one or more of the master roles are unavailable do to a failure of a fault domain or an unavailable upgrade domain. While a fewer number servers may be needed in this example (as compared to that which is discussed with respect to FIG. 6), it is contemplated that additional fault domains and upgrade domains may be implemented to ensure availability of the backup servers. As with FIG. 8 discussed above, it is contemplated that any number of master roles may be backed up by common machines, in an exemplary aspect.

Having briefly described an overview of various embodiments of the invention, an exemplary operating environment suitable for performing the invention is now described. Referring to the drawings in general, and initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, and the like. The invention may also be practiced in distributed computing environments where tasks are performed by remote-processing devices that are linked through a communications network.

Figure 7:
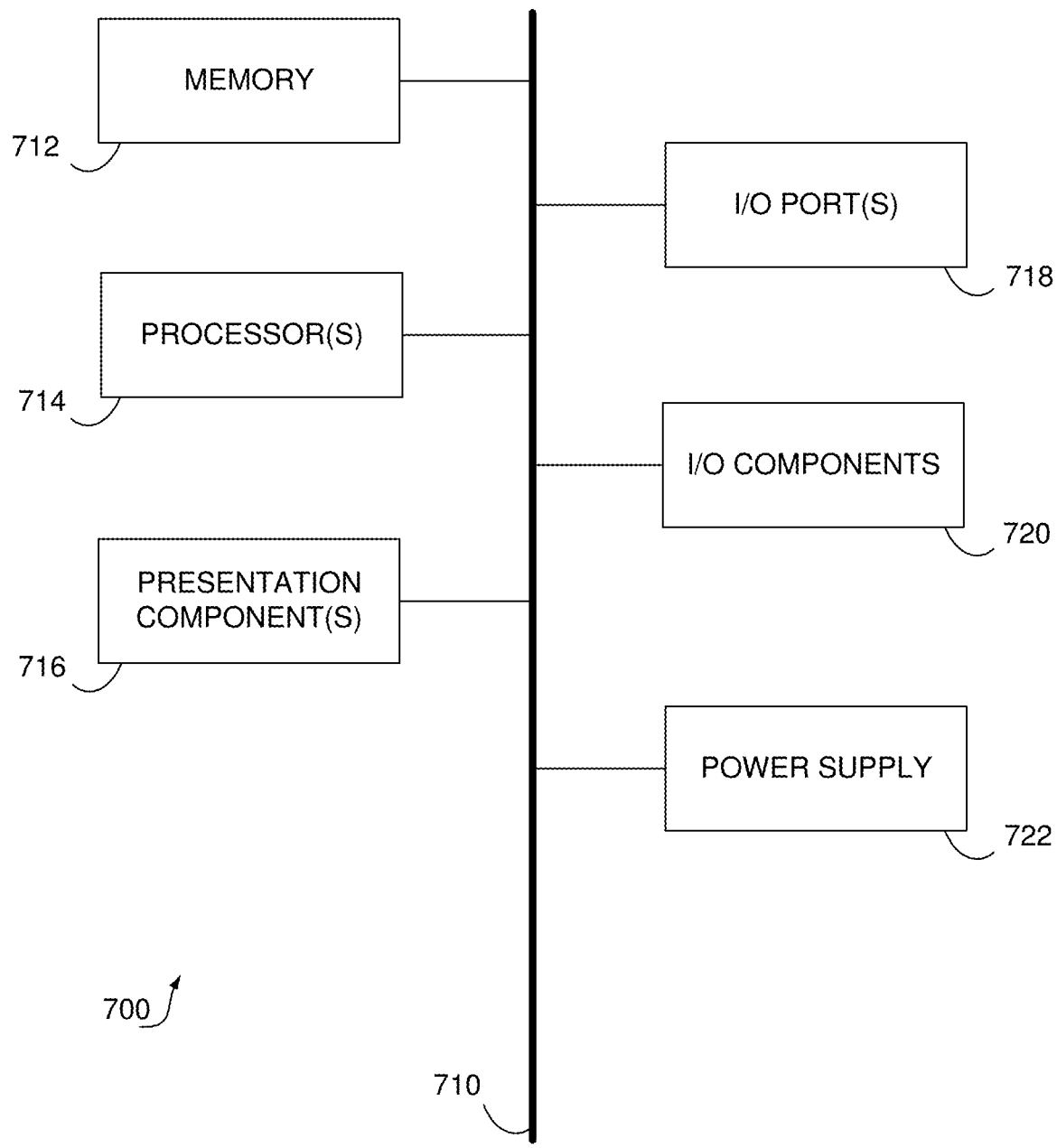
FIG. 7 is a block diagram of an exemplary computing environment suitable for use in implementing embodiments of the present invention.

With continued reference to FIG. 7, computing device 700 includes a bus 710 that directly or indirectly couples the following devices: memory 712, one or more processors 714, one or more presentation components 716, input/output (I/O) ports 718, I/O components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

The computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired information and which can be accessed by the computing device 700. In an embodiment, the computer storage media can be selected from tangible computer storage media. In another embodiment, the computer storage media can be selected from non-transitory computer storage media.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The memory 712 can include computer-storage media in the form of volatile and/or nonvolatile memory. The memory may be removable, non-removable, or a combination thereof. Exemplary hardware devices include solid-state memory, hard drives, optical-disc drives, etc. The computing device 700 includes one or more processors that read data from various entities such as the memory 712 or the I/O components 720. The presentation component(s) 716 present data indications to a user or other device. Exemplary presentation components include a display device, speaker, printing component, vibrating component, and the like.

The I/O ports 718 can allow the computing device 700 to be logically coupled to other devices including the I/O components 720, some of which may be built in. Illustrative components can include a microphone, joystick, game pad, satellite dish, scanner, printer, wireless device, etc.

Figure 9:
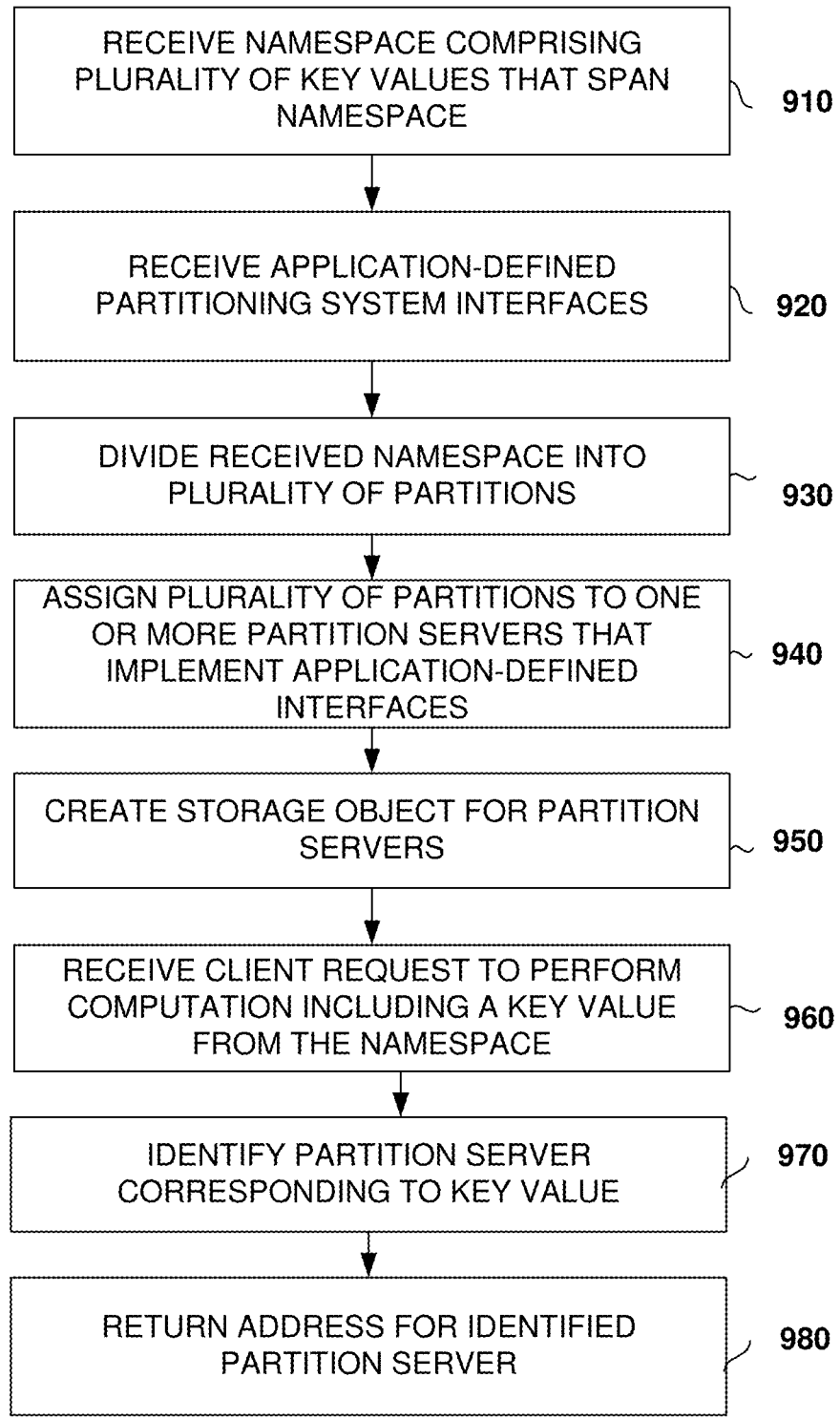
FIGS. 9 to 11 show examples of methods according to various embodiments of the invention.

FIG. 9 shows an example of a method according to the invention. In FIG. 9, a namespace is received 910 from a client application. The client application can correspond to any convenient type of computation that a client desires to perform in a distributed computing environment. The namespace comprises a plurality of key values that span the namespace. One or more application-defined partitioning system interfaces are also received 920. The application-defined partitioning system interfaces are in contrast to any fixed interfaces that are provided as part of a generic partitioning system. The received namespace is divided 930 (by a fixed partitioning system interface) into a plurality of partitions. The plurality of partitions are then assigned 940 to one or more partition servers. The partition servers also implement the application defined partitioning system interfaces. Additionally, a storage object is created 950 for each of the one or more partition servers. The storage object can contain, for example, information related to the partitions assigned to the corresponding partition server. A client request is received 960 to perform a computation. The request includes a key value from the received namespace. A partition server is identified 970 that corresponds to the received key value. An address for the identified partition server is returned 980 in response to the request.

Figure 10:
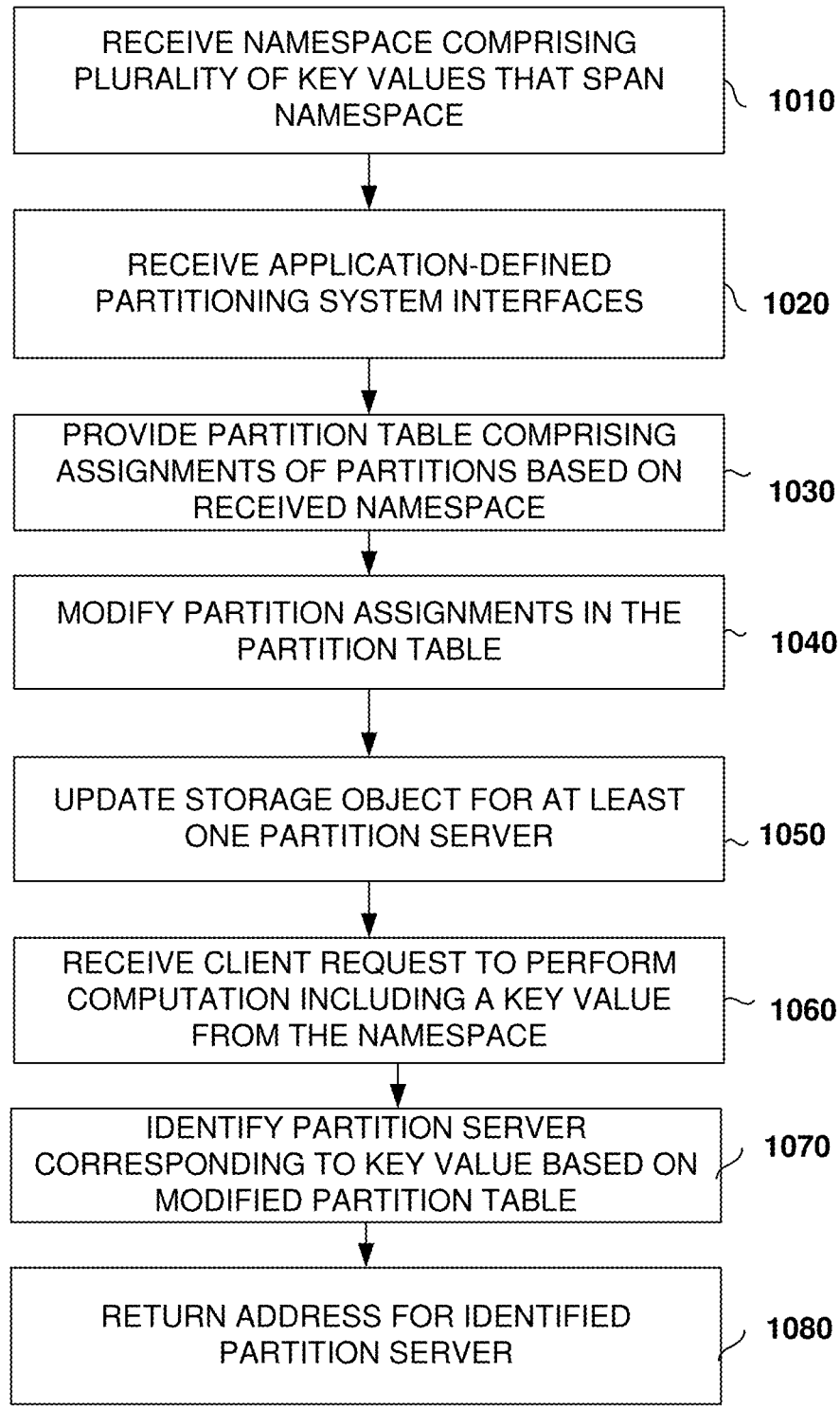

FIG. 10 shows an example of a method according to the invention. In FIG. 10, a namespace is received 1010 from a client application. The client application can correspond to any convenient type of computation that a client desires to perform in a distributed computing environment. The namespace comprises a plurality of key values that span the namespace. One or more application-defined partitioning system interfaces are also received 1020. The application-defined partitioning system interfaces are in contrast to any fixed interfaces that are provided as part of a generic partitioning system. A partition table is provided 1030 that comprises assignments of partitions to partition servers based on the received namespace. The partition servers will typically implement at least one of the received application-defined partitioning system interfaces. One or more of the partition assignments in the partition table are modified 1040. Based on the modified assignments, storage objects corresponding to at least one of the partition servers can be updated 1050. The storage object can contain, for example, information related to the partitions assigned to the corresponding partition server. A client request is then received 1060 to perform a computation. The request includes a key value from the received namespace. A partition server is identified 1070 that corresponds to the received key value. An address for the identified partition server is returned 1080 in response to the request.

Figure 11:
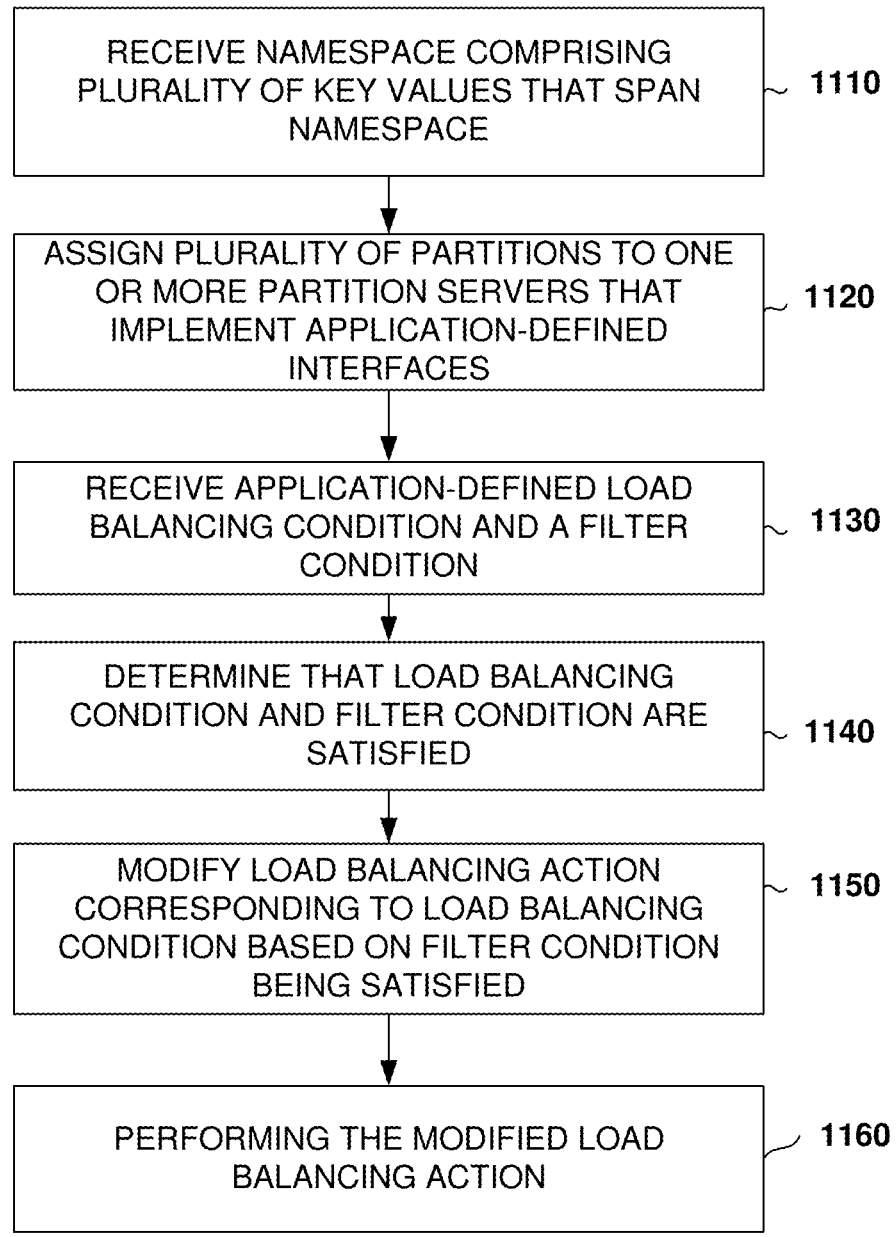

FIG. 11 shows another example of a method according to the invention. In FIG. 11, a namespace is received 1110 from a client application. The client application can correspond to any convenient type of computation that a client desires to perform in a distributed computing environment. The namespace comprises a plurality of key values that span the namespace. A plurality of partitions based on the namespace are assigned 1120 to one or more partition servers. The partition servers can implement one or more application-defined partitioning system interfaces. An application-defined load balancing condition and a filter condition are received 1130. The load balancing condition can be based on an expression that includes at least one metric received from the partition servers. Subsequently, it is determined 1140 that the load balancing condition and the filter condition are satisfied. A load balancing action corresponding to the load balancing condition is modified 1150 based on the filter condition being satisfied. The modified load balancing action is then performed 1160.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

In an embodiment, a method is provided for performing partitioning on an application-defined namespace in a distributed computing environment. The method includes receiving a namespace from a client application comprising a plurality of key values that span the namespace; receiving one or more application-defined partitioning system interfaces; dividing, by a fixed partitioning system interface, the received namespace into a plurality of partitions; assigning, by a fixed partitioning system interface, the plurality of partitions to one or more partition servers that implement at least one of the received application-defined partitioning system interface; creating, by one or more fixed partitioning system interfaces, a storage object for each of the one or more partition servers, the storage object comprising information related to partitions assigned to the one or more partition servers; receiving a client request to perform a computation, the request including a key value from the namespace; identifying a partition server corresponding to the key value based on the assigned one or more partitions; and returning, in response to the received request, an address for the identified partition server.

In another embodiment, a method is provided for performing partitioning on a client defined namespace in a distributed computing environment. The method includes receiving a namespace from a client application comprising a plurality of key values that span the namespace; receiving one or more application-defined partitioning system interfaces; providing a partition table comprising assignments of a plurality of partitions based on the received namespace to one or more partition servers that implement at least one of the application-defined partitioning system interfaces; modifying, by fixed partitioning system interface of a master role instance, one or more partition assignments in the partition table; updating, by a fixed partitioning system interface of a partition server, a storage object for at least one partition server, the storage object comprising information related to partitions assigned to the partition server, the update corresponding to one or more of the modified partition assignments; receiving a client request to perform a computation, the request including a key value from the namespace; identifying a partition server corresponding to the key value based on the modified one or more partition assignments in the partition table; and returning, in response to the received request, an address for the identified partition server.

In still another embodiment, a method for performing load balancing in a distributed computing environment is provided. The method includes receiving a namespace from an application comprising a plurality of key values that span the namespace; assigning, by a fixed partitioning system interface, a plurality of partitions based on the namespace to one or more partition servers, the plurality of partitions corresponding to key ranges that span the namespace, the partition servers implementing one or more application-defined partitioning system interfaces; receiving an application-defined load balancing condition and a filter condition, the load balancing condition comprising a condition for performing a load balancing action, the condition being based on an expression including at least one metric received from the partition servers; determining that the load balancing condition and the filter condition are satisfied; modifying, by a fixed partitioning system interface, a load balancing action corresponding to the load balancing condition based on the filter condition being satisfied; and performing, by a fixed partitioning system interface, the modified load balancing action.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

What is claimed is:

1. A method for performing operations on a client defined namespace in a distributed computing environment, comprising:
receiving a namespace at a system, from a client application, the namespace comprising a plurality of key values that span the namespace;
receiving one or more application-defined interfaces, at the system, wherein application-defined interfaces are comprised of computations, operations, or functions defined by the client application;
dividing, by one or more fixed system interfaces, the received namespace into a plurality of partitions, wherein fixed interfaces are comprised of computations, operation, or functions integrated into the system;
assigning, by the one or more fixed interfaces, the plurality of partitions to one or more partition servers that implement at least one of the received application-defined interfaces, wherein the fixed interfaces and application-defined interfaces operationally separate distributed computing environment operations for the one or more partition servers, from application-specific operations for the one or more partition servers;
creating, by the one or more fixed interfaces, a storage object for each of the one or more partition servers, the storage object comprising information related to partitions assigned to the one or more partition servers;
receiving a client request to perform a computation, the request including a key value from the namespace;
identifying a partition server corresponding to the key value based on the assigned one or more partitions; and
returning, in response to the received request, an address for the identified partition server.

2. The method of claim 1, wherein assigning one or more partitions to a plurality of partition servers comprises:
constructing a partition table containing assignments of the plurality of partitions to the one or more partition servers; and
sending messages containing partition assignments to the one or more partition servers.

3. The method of claim 2, wherein the messages are heartbeat messages from a fixed interface of a master role instance to the one or more partition servers.

4. The method of claim 2, further comprising:
receiving a heartbeat response message from a first partition server comprising partition assignment information for at least one partition assigned to the partition server;
detecting a conflict between the partition assignment information from the heartbeat response message with the partition table; and
assigning the at least one partition to one or more different partition server virtual machines.

5. The method of claim 1, wherein the storage objects for the partition servers are created by a fixed interface.

6. The method of claim 1, wherein the one or more application-defined interfaces cannot access the partition table.

7. The method of claim 1, wherein a plurality of partitions are assigned to at least one partition server, the key value ranges for the plurality of partitions not being contiguous in the namespace.

8. The method of claim 1, wherein the key values have a defined order when the namespace is serialized.

9. The method of claim 1, wherein the partition servers are implemented as virtual machines in a distributed computing environment.

10. One or more hardware computer-storage media storing computer-useable instructions that, when executed, perform a method for performing partitioning on a client defined namespace in a distributed computing environment, comprising:
receiving a namespace at a system, from a client application comprising a plurality of key values that span the namespace;
accessing one or more application-defined interfaces, at the system, wherein application-defined interfaces are comprised of computations, operations, or functions defined by the client application;
providing a partition table comprising assignments of a plurality of partitions based on the received namespace to one or more partition servers that implement at least one of the received application-defined partitioning system interfaces;
modifying, by one or more fixed interfaces of a master role instance, one or more partition assignments in the partition table, wherein fixed interfaces are comprised of computations, operations, or functions integrated into the system, wherein the fixed interfaces and application-defined interfaces operationally separate distributed computing environment operations for the one or more partition servers, from application-specific operations for the one or more partition servers;
updating, by the one or more fixed interfaces of a partition server, a storage object for at least one partition server, the storage object comprising information related to partitions assigned to the partition server, the update corresponding to one or more of the modified partition assignments;
receiving a client request to perform a computation, the request including a key value from the namespace;
identifying a partition server corresponding to the key value based on the modified one or more partition assignments in the partition table; and
returning, in response to the received request, an address for the identified partition server.

11. The method of claim 10, further comprising: sending a message containing modified partition assignments to at least one partition server.

12. The method of claim 11, wherein the message is a heartbeat message from a fixed interface of a master role instance in the partitioning system to the at least one partition server.

13. The method of claim 10, further comprising:
receiving a heartbeat response message from a first partition server comprising partition assignment information for at least one partition assigned to the partition server virtual machine; and
detecting a conflict between the partition assignment information from the heartbeat response message with the partition table, wherein modifying the one or more partition assignments is in response to the detected conflict.

14. The method of claim 10, wherein the one or more application-defined interfaces cannot access the partition table.

15. One or more hardware computer-storage media storing computer-useable instructions that, when executed, perform a method for performing load balancing in a distributed computing environment, comprising:

receiving a namespace at a system, from an application, the namespace comprising a plurality of key values that span the namespace;

assigning, by one or more fixed interfaces, a plurality of partitions based on the namespace to one or more partition servers, the plurality of partitions corresponding to key ranges that span the namespace, the partition servers implementing one or more application-defined interfaces, wherein fixed interfaces are comprised of computations, operations, or functions integrated into the system;

receiving, by one or more application-defined interfaces, an application-defined load balancing condition and a filter condition, the load balancing condition comprising a condition for performing a load balancing action, the condition being based on an expression including at least one metric received from the partition servers, wherein application-defined interfaces are comprised of computations, operations, or functions defined by the application, wherein the fixed interfaces and application-defined interfaces operationally separate distributed computing environment operations for the one or more partition servers, from application-specific operations for the one or more partition servers;

determining that the load balancing condition and the filter condition are satisfied; and modifying, by the one or more fixed interfaces, a load balancing action corresponding to the load balancing condition based on the filter condition being satisfied; and performing, by the one or more fixed interfaces, the modified load balancing action.

16. The method of claim 15, wherein the filter condition is based on a partition load metric, a server load metric, or a combination thereof.

17. The method of claim 15, wherein the modified load balancing action comprises:

removing the assignment of a partition from a first partition server;

selecting, by the fixed interface, a partition server for assignment of the removed partition from a group of partition servers, the group of partition servers excluding at least one partition server based on the filter condition; and assigning the removed partition to the selected partition server.

18. The method of claim 15, wherein the modified load balancing action comprises:

determining that a received condition trigger is satisfied for a first partition server;

selecting, by the fixed interface, a partition for removal from the first partition server from a group of partitions assigned to the first partition server, the group of partitions excluding at least one partition based on the filter condition;

removing the assignment of the selected partition from the first partition server; and assigning the removed partition to a second partition server.

19. The method of claim 15, wherein the load balancing action is performed in a stateless manner.

20. The method of claim 15, wherein the assignments of partitions to partition servers are stored by a fixed interface in a partition table, and wherein application-defined interfaces cannot access the partition table.

* * * * *